(12) United States Patent
Brisimitzakis et al.

(10) Patent No.: US 10,459,570 B2
(45) Date of Patent: Oct. 29, 2019

(54) ANALOG WATCH WITH TOUCH INTERFACE

(71) Applicant: Garmin Switzerland GmbH, Schaffhausen (CH)

(72) Inventors: Evangelos V.A. Brisimitzakis, Lenexa, KS (US); Adam W. Roush, Lenexa, KS (US)

(73) Assignee: Garmin Switzerland GmbH (CH)

( * ) Notice: Subject to any disclaimer, the term of this patent is extended or adjusted under 35 U.S.C. 154(b) by 0 days.

(21) Appl. No.: 16/111,972

(22) Filed: Aug. 24, 2018

(65) Prior Publication Data

US 2019/0138145 A1 May 9, 2019

Related U.S. Application Data

(60) Provisional application No. 62/550,436, filed on Aug. 25, 2017.

(51) Int. Cl.
| | |
|---|---|
| *G06F 3/041* | (2006.01) |
| *G04C 3/14* | (2006.01) |
| *G06F 3/0481* | (2013.01) |
| *G04G 17/08* | (2006.01) |
| *G04G 21/08* | (2010.01) |

(52) U.S. Cl.
CPC .......... *G06F 3/0416* (2013.01); *G04C 3/146* (2013.01); *G04G 17/08* (2013.01); *G04G 21/08* (2013.01); *G06F 3/0481* (2013.01)

(58) Field of Classification Search
CPC ..... G06F 3/0416; G06F 3/0481; G04C 3/146; G04G 17/08; G04G 21/08
See application file for complete search history.

(56) References Cited

U.S. PATENT DOCUMENTS

| | | | |
|---|---|---|---|
| 10,146,188 B2 * | 12/2018 | Katzer | G04B 19/04 |
| 2003/0123329 A1 | 7/2003 | Guanter et al. | |
| 2015/0241852 A1 * | 8/2015 | Yang | G04G 17/08 |
| | | | 368/223 |

(Continued)

FOREIGN PATENT DOCUMENTS

KR 10-2016-0123936 10/2016

OTHER PUBLICATIONS

International Search Report and Written Opinion from corresponding PCT Application No. PCT/US2018/047963, filed Aug. 24, 2018.

(Continued)

*Primary Examiner* — Michael Pervan
(74) *Attorney, Agent, or Firm* — Samuel M. Korte; Max M. Ali

(57) ABSTRACT

A wearable electronic device including a housing including a watch face, a protective material, a display, a touch panel comprising a plurality of touch sensors, a first watch hand, a first watch hand actuation apparatus, a memory, and a processor. In embodiments, the processor is configured to receive a touch signal from at least one of the plurality of touch sensors, determine a position of the first watch hand, identify a signal threshold of a touch sensor by selecting one of a plurality of signal thresholds stored in the memory, and identify a touch input received by the touch sensor once the touch signal received from the corresponding touch sensor exceeds the selected signal threshold.

20 Claims, 15 Drawing Sheets

(56) References Cited

U.S. PATENT DOCUMENTS

| | | |
|---|---|---|
| 2016/0313706 A1 | 10/2016 | San et al. |
| 2017/0075305 A1 | 3/2017 | Ryu et al. |
| 2017/0075317 A1 | 3/2017 | Cho et al. |
| 2017/0082983 A1* | 3/2017 | Katzer .................. G04B 19/04 |
| 2017/0212479 A1* | 7/2017 | Kwon .................. G04R 60/10 |
| 2017/0293267 A1* | 10/2017 | Zhang .................... G04G 9/00 |

OTHER PUBLICATIONS

Printout from https://us.tissotshop.com/tissot-t-touch-expert-solar-quartz-7.html published prior to Aug. 24, 2018.
Printout from https://www.mykronoz.com/us/en/zetime.html published prior to Aug. 24, 2018.

* cited by examiner

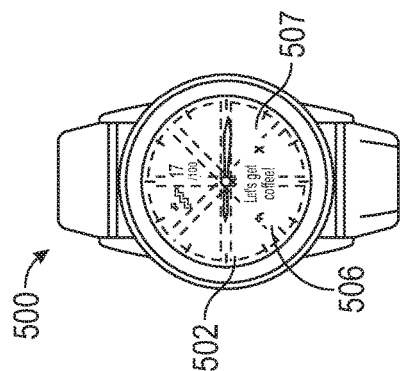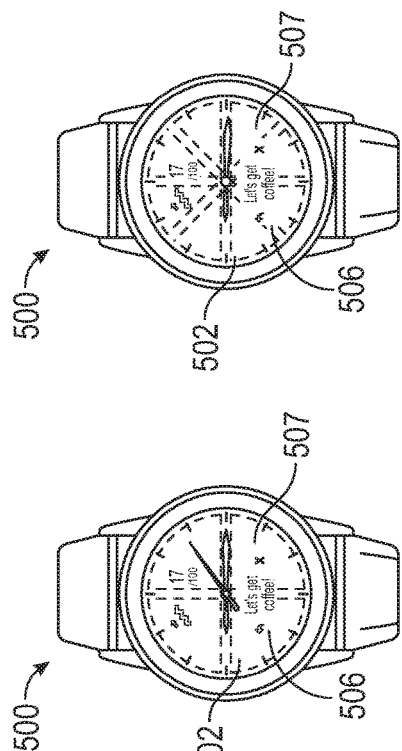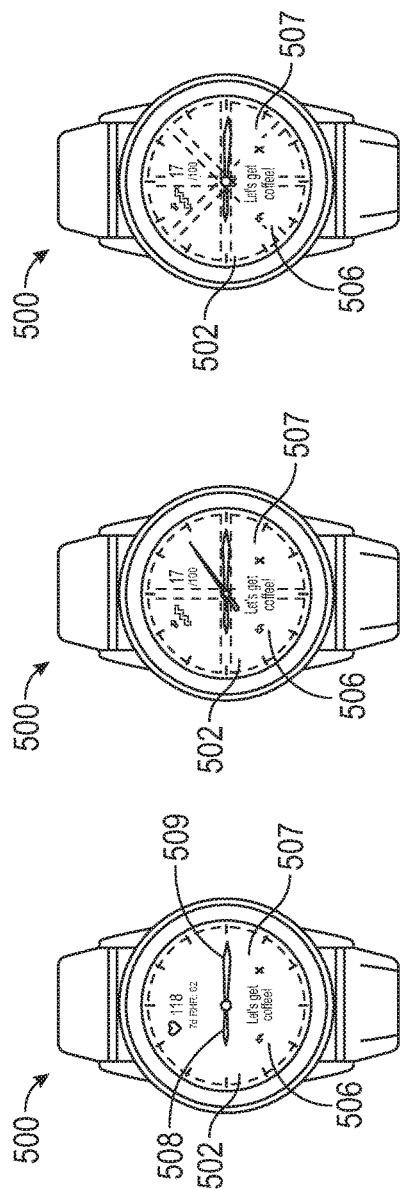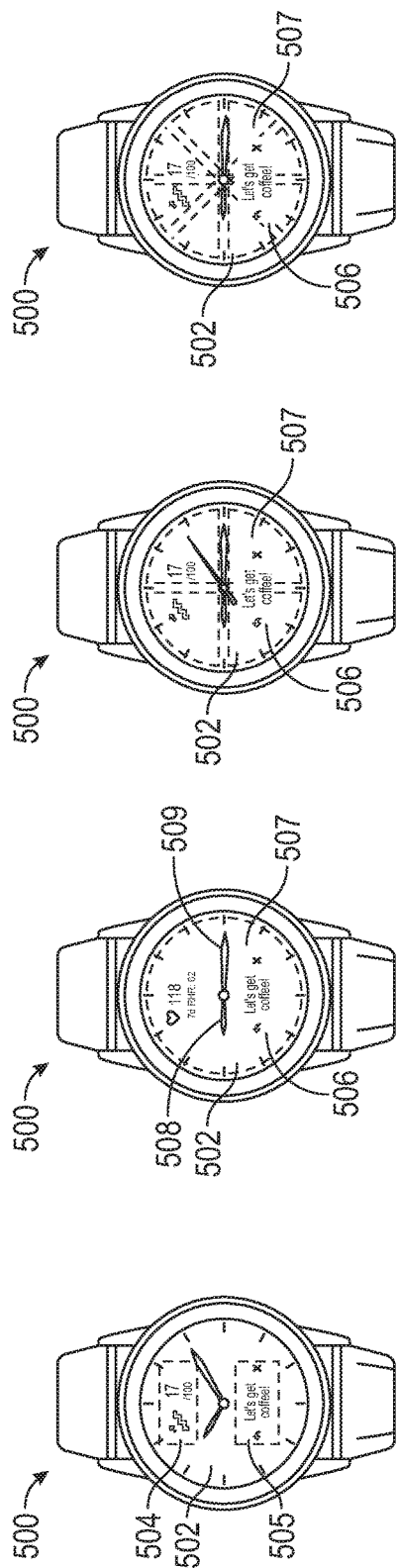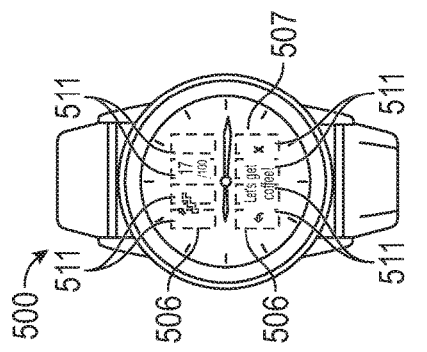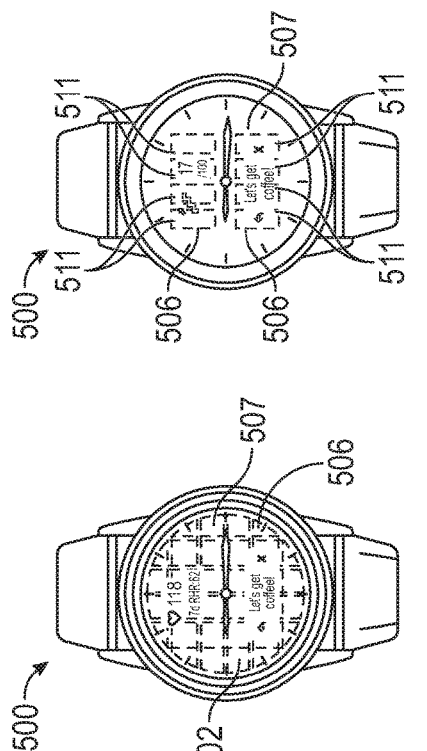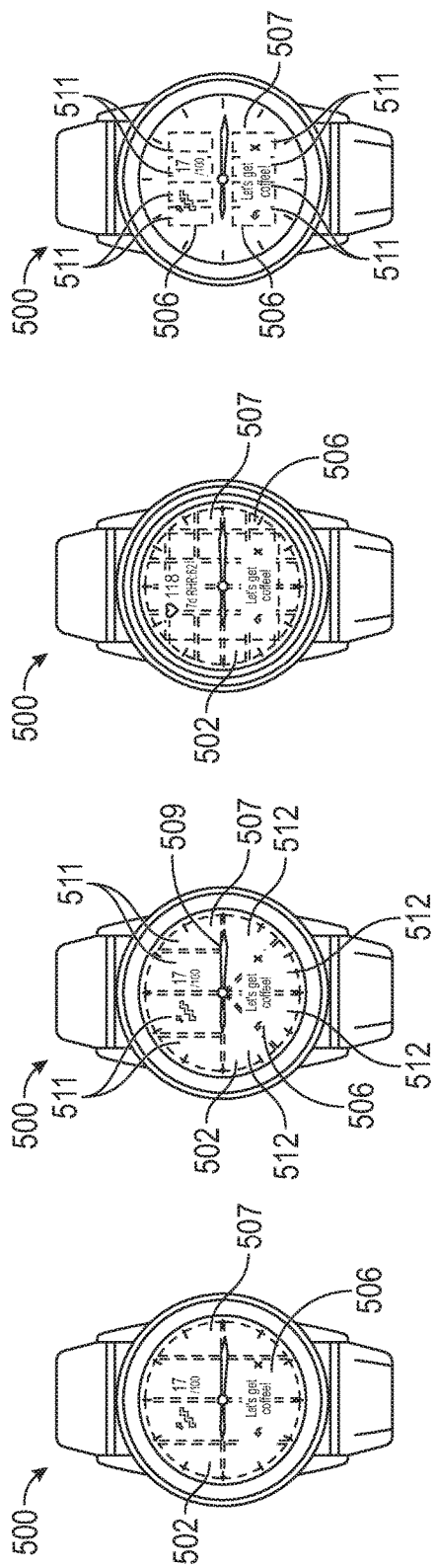

ANALOG WATCH WITH TOUCH INTERFACE

RELATED APPLICATIONS

The present application claims priority benefit to commonly assigned U.S. provisional patent application entitled, "ANALOG WATCH WITH TOUCH INTERFACE," Application Ser. No. 62/550,436, filed Aug. 25, 2017. The above application is hereby incorporated by reference into the current application in its entirety.

BACKGROUND

Conventional wearable electronic devices having a touch panel, such as a capacitive touch screen, position the touch panel at, along, or proximate to an exterior surface of the electronic device. These conventional electronic devices typically utilize a display, such as an LCD display panel, to present information to a user. The touch panel is commonly positioned above the display within a stack of related components (when viewed from the side), such as a transparent protective material (e.g., glass, plastic, etc.) that is physically contacted by a user's finger and through which the display may be viewed, a backlight, and a reflective panel at the bottom of the stack that redirects light output by the backlight towards the display. The stack of components may include additional transparent materials that provide a variety of functions as well as separate adjacent layers or components. The stack of components within conventional electronic devices minimizes or eliminates any air gap between the transparent protective material at the top of the stack of components and the display or the touch panel. Additionally, conventional wearable electronic devices having a touch panel and a display do not include within the air gap analog watch hands (a.k.a., watch hands) positioned to indicate a current time (e.g., hour hand, minute hand, second hand, etc.) or other information.

Some conventional touch integrated circuits (ICs) utilize a baseline to account for environmental changes (e.g., temperature, humidity, etc.) that may impact performance of the touch ICs. For example, when a user wearing a conventional electronic device having a conventional touch IC walks from a room having a first environmental characteristic to a room having a second environmental characteristic, the conventional touch IC will adjust the performance of all touch elements of a touch panel to account for the environmental change. Use of such baseline techniques does not account for changes in the signal output by the touch panel (or touch elements of the touch panel) in response to a touch input provided by a user's finger, which is typically a quick event. Additionally, where the conventional wearable electronic device comprises one or more watch hands within an air gap above the touch sensor, as described above, conventional touch ICs fail to compensate for the temporary positioning of one or more of the watch hands proximate to a touch sensor as the watch hands rotate within the air gap.

SUMMARY

The present disclosure is directed to a wearable electronic device configured to identify a touch input received by one of a plurality of touch sensors separated from a protective material by an air gap including one or more watch hands. In embodiments, the wearable electronic device comprises a housing including a watch face and one or more side walls. The device may further comprise a protective material positioned above the one or more side walls, a touch panel positioned under the protective material and comprising a plurality of touch sensors, each touch sensor associated with a region of the watch face, the touch panel separated from the protective material by an air gap. The device may further comprise a first watch hand positioned within the air gap and proximate to the touch panel and a first watch hand actuation apparatus attached to the first watch hand and configured to rotate the first watch hand within the air gap. A memory may be configured to store a plurality of signal thresholds for each of the plurality of touch sensors, the plurality of signal thresholds associated with a position of the first watch hand. A processor may be operably coupled to the touch panel, the first watch hand actuation apparatus, and the memory, the processor configured to receive a touch signal from at least one of the plurality of touch sensors, determine a position of the first watch hand, identify the signal threshold of at least one of the plurality of touch sensors by selecting one of the plurality of signal thresholds based on the determined position of the first watch hand, and identify a touch input received by one of the plurality of touch sensors once the touch signal received from the corresponding touch sensor exceeds the selected signal threshold.

This Summary is provided to introduce a selection of concepts in a simplified form that are fully described below in the Detailed Description and Drawings. This Summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The detailed description is described with reference to the accompanying figures. The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

FIGS. 5A-5H are top plan views of the wearable electronic device of FIG. 1A illustrating embodiments of the invention wherein substantially all of a watch face of the wearable electronic device comprises a display and touch panel.

DETAILED DESCRIPTION

Figure 1A:
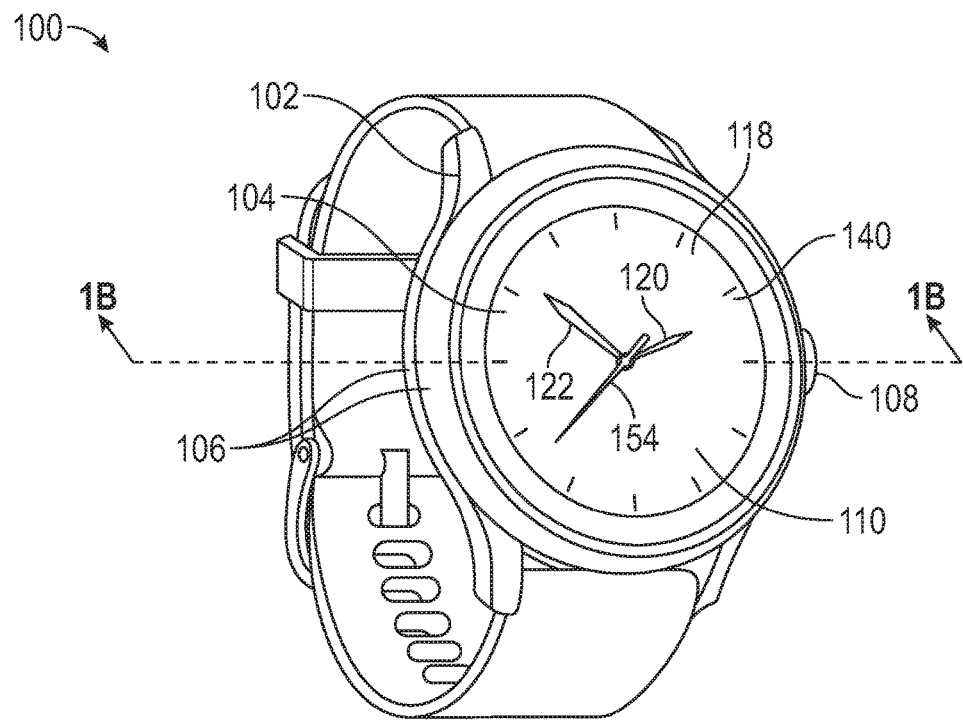
FIG. 1A is a perspective view of a wearable electronic device in accordance with an embodiment of the present disclosure.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a wearable electronic device that is operable to account for the presence or absence of a physical object in a space between a touch sensor and a touch surface. While embodiments disclosed herein are directed to a watch comprising such touch sensors, and the intervening physical object being watch hands, it is contemplated and included within the scope of the invention that the systems and methods disclosed herein may be applied in other settings to address similar problems.

Referring now to FIGS. 1A-1C and FIG. 2, a wearable electronic device 100, taking the form of a watch, is presented. The watch 100 may comprise a housing 102 including a watch face 104 and one or more sidewalls 106. The watch 100 may further comprise one or more user input devices 108 that may be operated by a user to provide an input to the watch 100. The user input devices 108 may take the form of at least one of a depressible button, a rotating crown, a pushbutton crown, and the like. In embodiments, the user input devices 108 may also be a rotating bezel or a switch. In the present embodiment, the user input devices 108 take the form of depressible buttons that extend out of a sidewall 106 of the housing 102.

The watch 100 may further comprise a protective material 110 positioned above watch face 104 and, in some embodiments, attached to an upper surface of the sidewalls 106. An inner cavity may be formed by the housing 102 and the protective material 110. The protective material 110 may be transparent or semi-transparent and formed of any suitable material as is known in the industry, including, but not limited to, plastic, polymers, glass, mineral glass, synthetic sapphire, and the like. The protective material 110 may protect components positioned in the inner cavity by preventing physical access thereto while permitting a user to view the watch face 104 through the protective material 110.

Figure 1B:
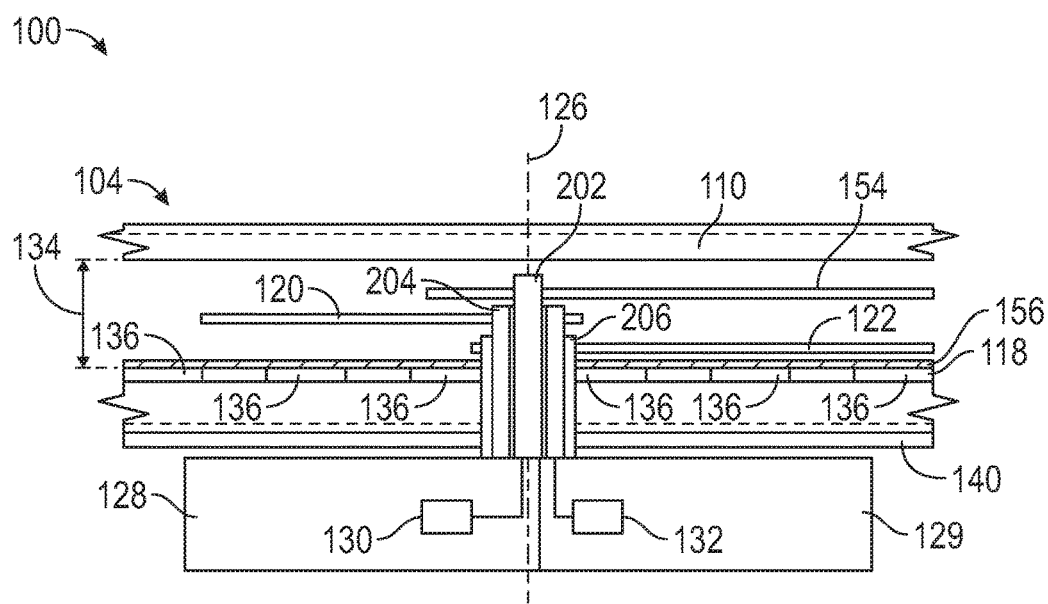
FIG. 1B is a partial sectional view of the wearable electronic device of FIG. 1 taken through line 1B-1B from FIG. 1A.

The watch 100 further comprises one or more watch hands. In the present embodiment, the watch 100 comprises a first watch hand 120 and a second watch hand 122. It is contemplated and included within the scope of the invention that the watch 100 may comprise any number of watch hands, as well as associated componentry as will be described in detail herein below. The first and second watch hands 120, 122 may be formed of any electrically conductive or non-conductive material as is known in the art. The first and second watch hands 120, 122 may be configured to have a length, a width, and a thickness, such that the first and second watch hands 120, 122 are positioned proximate to the watch face 104 and located within the inner cavity of the watch 100. For example, the first watch hand 120 may be an hour hand and the second watch hand 122 may be a minute hand. In embodiments, the watch 100 may further comprise a third watch hand configured to be a second hand. Together, the first and second watch hands 120, 122 may indicate the time of day to a user. In embodiments, as shown in FIG. 1B, the watch 100 may include a third watch hand 154 that may be controlled by the processor 150 to indicate seconds for a current time.

The watch 100 may further comprise a watch hand actuation apparatus associated with each watch hand. In the present embodiment, the watch 100 may comprise a first watch hand actuation apparatus 128 and a second watch hand actuation apparatus 129. As seen in FIG. 1B, the first watch hand actuation apparatus 128 may be coupled to the first watch hand 120 via a first drive shaft 204 and the second watch hand actuation apparatus 129 may be coupled to the second watch hand 122 via a second drive shaft 206. Similarly, a third watch hand actuation apparatus and a third stepper motor, which are not depicted in FIG. 1B, may be coupled to the third watch hand 154 via a third drive shaft 202.

In embodiments, each of the drive shafts 202-206 are concentric, with the third drive shaft 202 being a solid cylinder and the first and second drive shafts 204, 206 being hollow cylinders. The first drive shaft 204 is positioned around the third drive shaft 202 and the second drive shaft 206 is positioned around the first drive shaft 204. Any alternative configurations of drive shafts that can cause watch hands to rotate so as to indicate time are included within the scope of the invention.

The first watch hand actuation apparatus 128 comprises a first stepper motor 130 connected to the first drive shaft 204 and operable to rotate the first drive shaft 204 about a rotation axis 126, thereby causing the first watch hand 120 to rotate about the rotation axis 126 to indicate a current hour. Similarly, the second watch hand actuation apparatus 129 comprises a second stepper motor 132 connected to the second drive shaft 206 and operable to rotate the second drive shaft 206 about the rotation axis 126, thereby causing the second watch hand 122 to rotate about the rotation axis 126 to indicate a current minute. The third watch hand actuation apparatus may comprise a third stepper motor connected to the first drive shaft 202 and operable to rotate the first drive shaft 202 about the rotation axis 126, thereby causing the second watch hand 154 to rotate about the rotation axis 126 to indicate a current second. While stepper motors are disclosed, it is to be understood that the first watch hand actuation apparatus 128 and the second watch hand actuation apparatus 129 may utilize any other device to cause rotation of the first and second drive shafts 204, 206, and the first and second watch hands 120, 122, respectively.

The watch 100 may further comprise a touch panel 118 configured to receive touch inputs from a user. The touch panel 118 may be positioned below watch face 104 and each of the first and second watch hands 120, 122. In embodiments, an air gap 134 is formed between an upper surface of watch face 104 and a lower surface of the protective material 110. The first and second watch hands 120, 122 are positioned within the air gap 134 and configured to rotate within the air gap 134 when actuated by the first and second watch hand actuation apparatuses 128, 129, via the first and second drive shafts 204, 206, respectively.

The touch panel 118 may comprise a plurality of touch sensors 136. The touch sensors 136 may be positioned such that different portions of the watch face 104 are associated with each touch sensor 136. Each touch sensor 136 may be operable to detect the presence or absence of an object in an area above the touch sensor 136. For example, when a user provides an input to watch 100 by contacting an upper surface of the protective material 110, such as pressing their finger or a stylus to the protective material 110, the touch sensor 136 associated with the portion of the watch face 104 corresponding to the area of the protective material 110 that received the user input may generate a touch signal associated with the touch input. The touch signal may indicate that a touch input was received and the magnitude of the input. Touch inputs may include inputs, gestures, and movements where the user's finger or a stylus contacts the upper surface of the protective material 110. In embodiments, a touch input may be identified where a user's finger or stylus hovers above the protective material 110 such that contact is not made with the protective material 110. The magnitude of the touch signal generated by the touch sensors 136 may be proportional to the pressure of the touch input. The touch sensors 136 may be any type of sensor operable to detect the presence or absence of objects within a field of view, including, but not limited to, capacitive sensors, Doppler effect sensors, eddy-current sensors, inductive sensors, magnetic sensors, optical sensors, radar sensors, sonar sensors, and the like.

The watch 100 may further comprise a display 140. The display 140 may be operable to present information to the user in textual or graphical formats. Information presented by the display 140 may be observable by a user through the protective material 110. The display 140 may employ any type of display technology as is known in the art, including, but not limited to, liquid crystal diode (LCD) display, thin film transistor (TFT) LCD displays, light-emitting diode (LED) displays, organic LED (OLED) displays, polymer LED (PLED) displays, quantum dot (QD) displays, light-emitting polymer (LEP) displays, and the like.

Figure 1C:
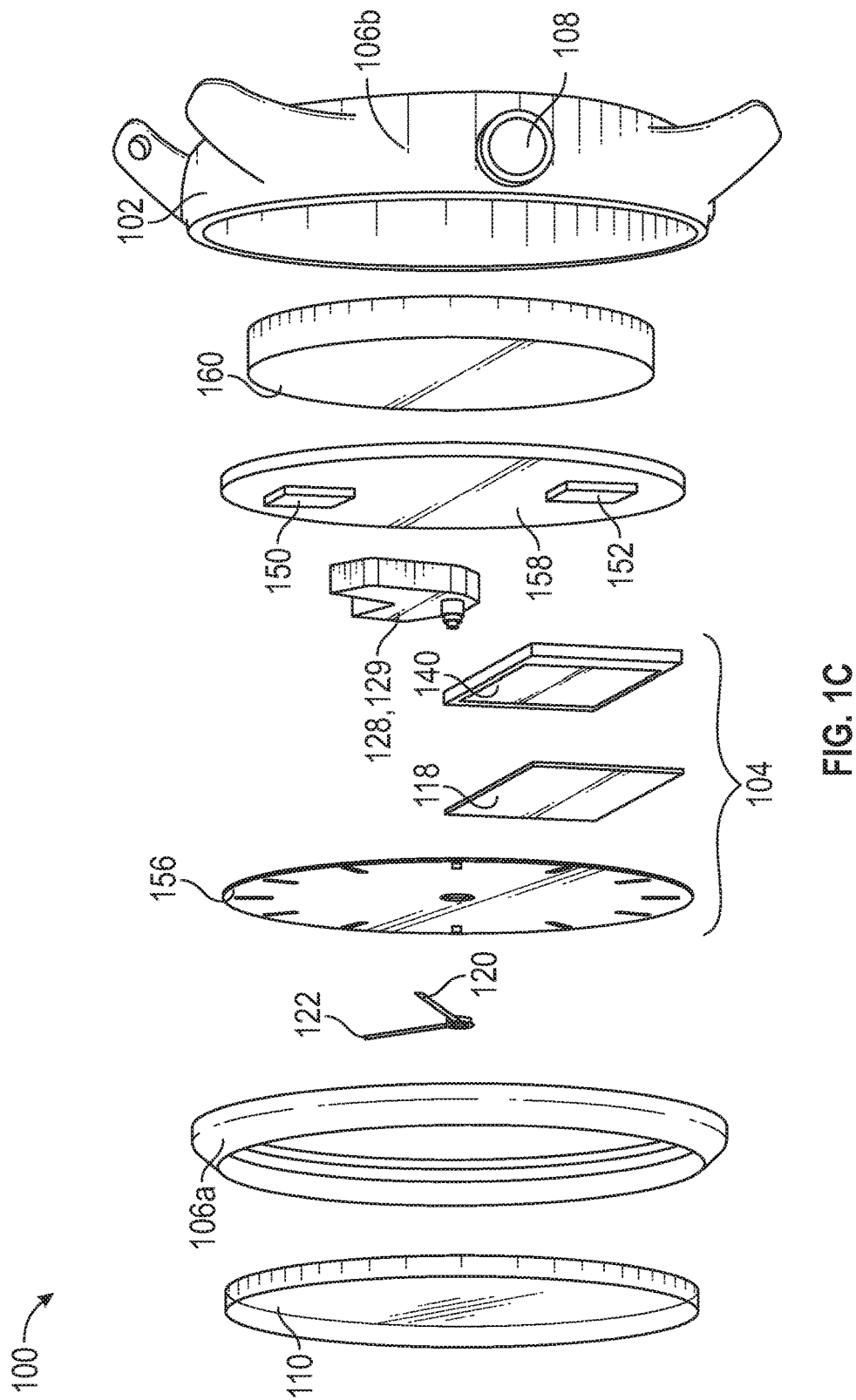
FIG. 1C is an illustration of an exploded view of the wearable electronic device of FIG. 1A in accordance with an embodiment of the present disclosure.

As shown in FIG. 1C, an exploded view of the watch 100 illustrates a dial 156 positioned over the touch panel 118 and the display 140. In embodiments where the display 140 covers substantially all of the watch face 104, the housing 102 may not include the dial 156. In embodiments where the display 140 partially covers watch face 104, the housing includes dial 156. In such embodiments, the watch face 104 is a combination of the dial 156 and the display 140. The side wall 106 of housing 102 may include an upper portion 106a (e.g., a bezel) that surrounds at least partially covers the protective material 110 and a lower portion 106b that is shaped to receive a printed circuit board 158 and a battery 160.

Figure 2:
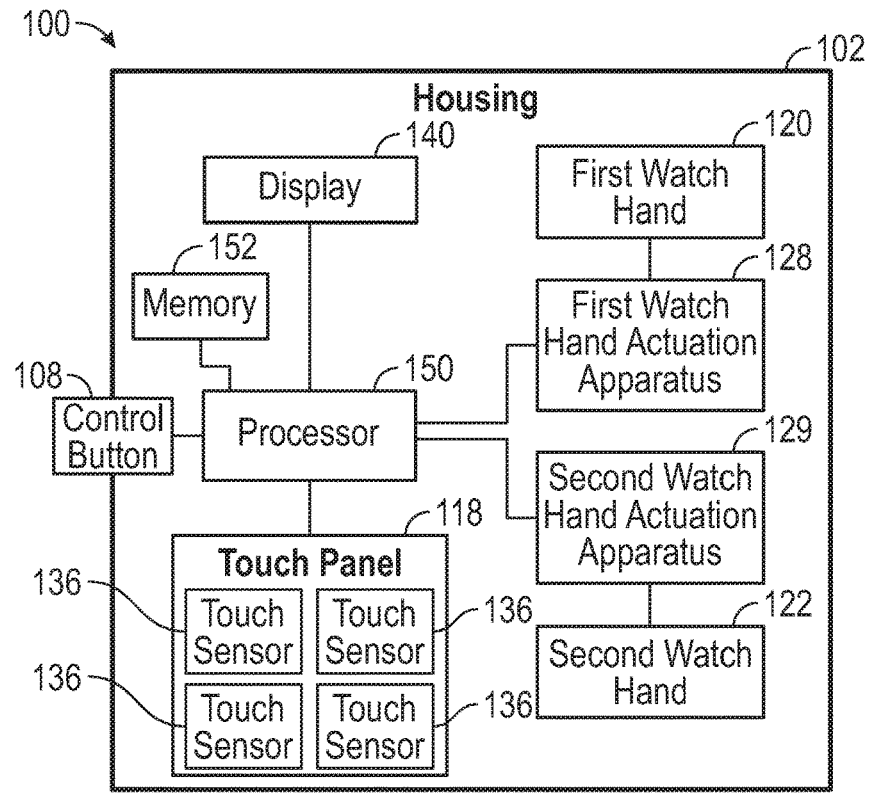
FIG. 2 is a block diagram illustrating example components of the wearable electronic device of FIG. 1A, according to an embodiment.

Referring now specifically to FIG. 2, additional elements of the watch 100 of FIGS. 1A-1C will be discussed. The watch 100 may further comprise a processor 150. It is to be understanding that processor 150 may be a single integrated circuit (IC) or be comprised of a plurality of ICs such that the plurality of ICs are configured to carry out the functions described herein. For example, the processor 150 may include a main processor IC and a second processor IC, such as a touch panel controller IC, that collectively carry out the functions described herein.

The processor 150 may be in communication with and operably coupled to each of the touch panel 118, and thereby the plurality of touch sensors 136, the first and second watch hand actuation apparatuses 128, 129, the display 140, and a memory 152. The processor 150 may be configured to receive touch signals generated by each touch sensor 136.

Moreover, the processor 150 may be configured to analyze the received touch signals to determine whether the magnitude (signal level) of the received touch signals exceeds a signal threshold stored in the memory 152. In general, a touch signal determined to exceed a signal threshold may indicate a touch input provided by a user. Accordingly, the processor 150 may be able to identify a touch input from a user based on a touch signal received from at least one of one of the plurality of touch sensors 136 and a signal threshold stored in the memory 152.

As will be discussed in greater detail hereinbelow, the processor 150 may be configured to account for the position of the first and second watch hands 120, 122 by adjusting the signal thresholds to account for the effect of the first or second watch hands 120, 122 on touch signals generated by each touch sensor 136 of touch panel 118. One or both of the first and second watch hands 120, 122 may be proximate to a touch sensor 136 based on the hour and minute associated with a current time, a position associated with a parameter or value (e.g., for use of the first and second watch hands 120, 122 to serve as an indicator as described below in FIG. 8), or any desired watch hand position.

The processor 150 is configured to determine a position of the first and second watch hands 120, 122. The processor 150 can store in, and subsequently retrieve from, the memory 152 the determined position of the first and second watch hands 120, 122. The processor 150 may control the first watch hand actuation apparatus 128 and the second watch hand actuation apparatus 129 to rotate each of the first and second watch hands 310, 312 in a clockwise or a counter-clockwise direction by any extent.

In some embodiments, the processor 150 may determine the position or location of the first and second watch hands 310, 312 based on position signals received from a watch hand position sensor. For example, the watch hand position sensor may be an optical sensor that may be operable to output one or more position signals associated with an intensity of light sensed at a known location over dial 156. Similarly, the watch hand position sensor may be an inductive sensor (e.g., a coil, a wire, etc.) that may be operable to output one or more position signals associated with a current level sensed at a known location over dial 156. The processor 150 may determine a presence of the first or second watch hands 310, 312, passing over a known location over dial 156 based on a predetermined amount of light received by or an induction level sensed by the optical sensor or the inductive sensor, respectively. In embodiments, the optical sensor may be integrated within the first and second watch hand actuation apparatuses 128, 129.

In some embodiments, the processor 150 may determine a position for each of the first and second watch hands 120, 122 based on a position signal received from each of the first and second watch hand actuation apparatuses 128, 129, which drive a current position of the first and second watch hands 120, 122. The position signal may indicate a current angular orientation of the associated watch hand, a current step position of a stepper motor, or any other indication of the position of the watch hand. The processor 150 may be operable to determine the position of the watch hand associated with the position signal by identifying a location of the watch hand on the watch face 104 based on the position signal, referencing information stored in the memory 152 associating a variety of watch hand positions with position signals based on one or more characteristics of the position signal, and the like.

Figure 11A:
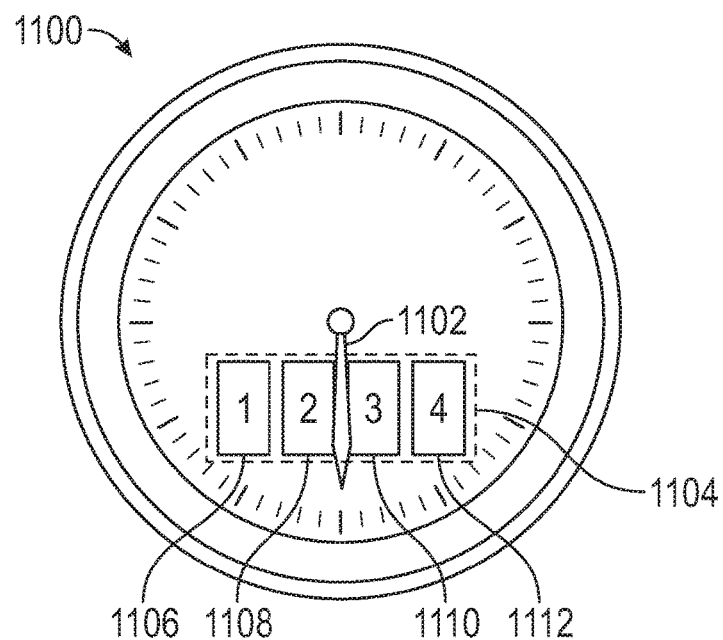
FIG. 11A is a top plan view of the wearable electronic device of FIG. 1A illustrating a calibration feature.

In some embodiments, the processor 150 may determine a position for each of the first and second watch hands 120, 122 based on a touch signal generated by the touch sensor 136 and one or more predetermined touch signal levels associated with a known position of the first and second watch hands 120, 122. The processor 150 may utilize this functionality to calibrate the first and second watch hands 120, 122. In embodiments, processor 150 may perform a calibration operation by controlling the first and second watch hand actuation apparatuses 128, 129, to drive a current position of the first and second watch hands 120, 122 within the air gap and compare touch signals received from one or more touch sensors 136 until the processor 150 identifies one or more touch signals matching or corresponding to a calibration signal stored in the memory 152 from the one or more touch sensors 136. For example, the processor 150 may control the first and second watch hand actuation apparatuses 128, 129, to iteratively drive the first and second watch hands 120, 122 to point to 6:00 (as shown in FIG. 11A) based on touch signals received from the one or more touch sensors 136 match or correspond to levels for the one or more touch signals stored in memory 152 that are associated with the first and second watch hands 120, 122 being positioned to point to 6:00. In embodiments, the processor 150 may utilize the current levels provided by one or more inductive sensors to perform a similar calibration operation.

The processor 150 may also control display 140 to present information on the display 140. For example, the processor 150 may be configured to control the display 140 to present a user interface. Any information may be included within the user interface depicted on the display 140, including, but not limited to, a current time, a current date, communication information (e.g., text messages, phone calls, e-mails, etc.), pictures, icons, biometric information associated with the user (e.g., heart rate, pulse oximetry, etc.), fitness information (e.g., steps taken, flights of stairs climbed, etc.), weather information, and the like. Furthermore, the processor 150 may be configured to present the user interface on the display 140 responsive to the determined positions of the first and second watch hands 120, 122, as will be described in greater detail hereinbelow.

The processor 150 may further be configured to identify, store and identify signal thresholds for each of the plurality of touch sensors 136 based on locations of the first and second watch hands 120, 122. The memory 152 may store a plurality of signal thresholds for each of the plurality of touch sensors 136. Each signal threshold for each touch sensor 136 may be adjusted to account for a position of the first and second watch hands 120, 122 to reduce false (erroneous) identification of touch inputs by the user. For example, the processor 150 may determine a proximity of the first and second watch hands 120, 122 to each touch sensor 136.

In embodiments, the processor 150 may adjust the signal threshold based on the movement of the first and second watch hands 120, 122. For example, the processor 150 may increase the signal threshold for a touch sensor 136 as the first or second watch hands 120, 122 rotate towards the touch sensor 136 and the processor 150 may decrease the signal threshold for the touch sensor 136 as the first or second watch hands 120, 122 rotate away from the touch sensor. As a result, an increased signal threshold will require a touch signal generated by a touch sensor 136 to be higher than would be required without the adjustment of the signal threshold to identify a touch input. Accordingly, each time the processor 150 determines a new position for one or both of the first and second watch hands 120, 122, the processor 150 may determine and adjust a signal threshold for each touch sensor 136 responsive to the newly determined watch hand position and thereafter utilize adjusted signal threshold when comparing touch signals from that touch sensor 136 to determine whether a touch input has been provided by the user. Thus, the adjusted signal threshold for a touch sensor 136 may correspond to a proximity of the first and second watch hands 120, 122 to the touch sensor 136.

In embodiments, the processor 150 may adjust the touch signal level based on the movement of the first and second watch hands 120, 122. For example, the processor 150 may normalize received touch signals from each of the plurality of touch sensors 136. The processor may normalize the touch signal level received from each of the plurality of touch sensors 136 based on a determined position of the first and second watch hands 120, 122. For example, the processor 150 may reduce a level of a touch signal received from a touch sensor 136 as the first or second watch hands 120, 122 rotate towards the touch sensor 136 and the processor 150 may increase a level of the touch signal received from the touch sensor 136 as the first or second watch hands 120, 122 rotate away from the touch sensor. Accordingly, the processor may select a normalized signal level for a touch signal received from a touch sensor 136 based on a determined position of the first and second watch hands 120, 122.

Figure 3A:
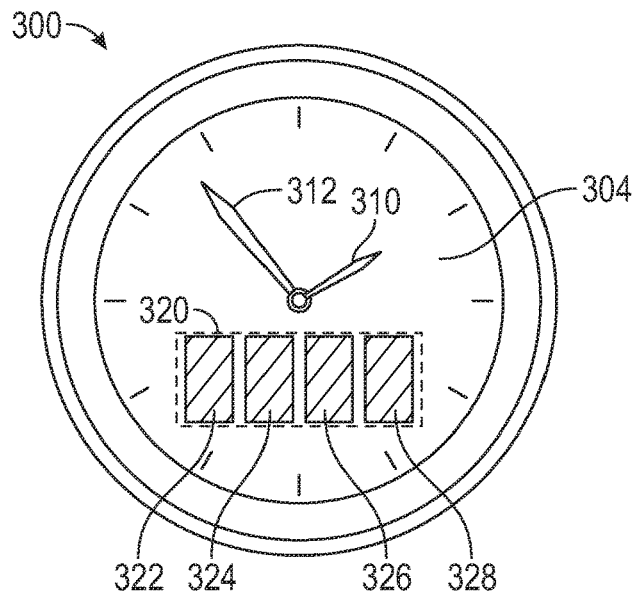
FIG. 3A is a top plan view of the wearable electronic device of FIG. 1A illustrating watch hands thereof positioned away from touch sensors.

Referring now to FIGS. 3A-I, additional aspects of the inventions are disclosed. FIG. 3A depicts a watch 300 having a watch face 304 including first and second watch hands 310, 312, and a touch panel 320 comprising a first touch sensor 322, a second touch sensor 324, a third touch sensor 326, and a fourth touch sensor 328. Each touch sensor 322-328 may be operable to generate a touch signal corresponding to a proximity of an object to an area or touch zone corresponding to the touch sensor 322-328. For example, each of the first, second, third, and fourth touch sensors 322, 324, 326, 328 may be associated with a first, second, third, and fourth touch zone. In such embodiments, the processor 150 may be configured to receive touch signals from one or more touch sensors 322-328 and determine whether a touch input has been received from a user's finger or stylus by analyzing the received touch signals. The memory 152 of the watch 300 may store a plurality of signal thresholds each associated with a touch zone. Such a determination may be based on whether a signal level of a touch signal exceeds a signal threshold associated with a touch sensor 322-328 from which the touch signal was received. In some embodiments, the processor 150 may determine a duration of time over which the signal level exceeds the signal threshold and determine whether a user input was received based on whether the determined duration exceeds a minimum touch duration stored in the memory 152. The processor 150 may be configured to implement any other combination or method of analysis as is known in the art.

Figure 3B:
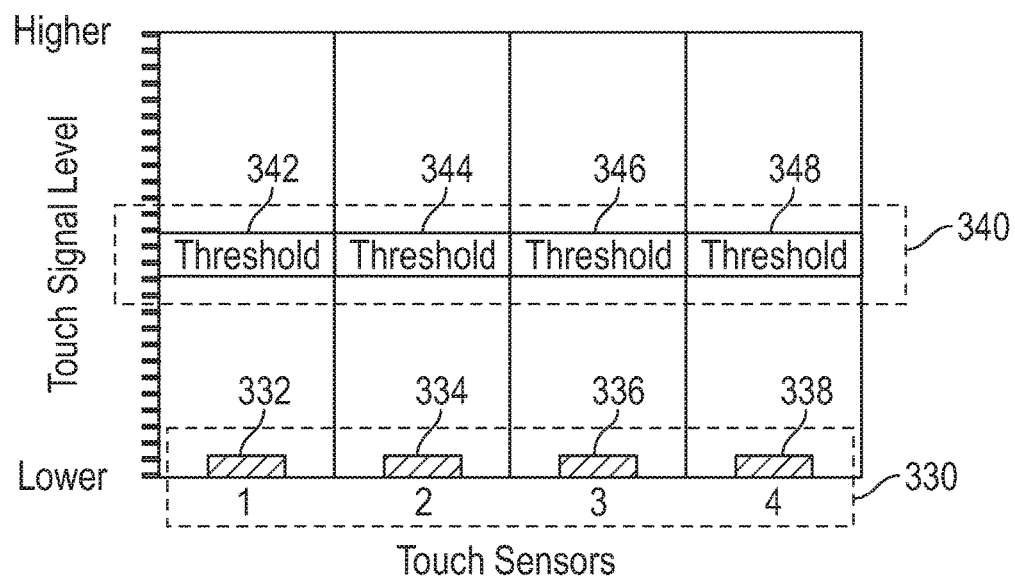
FIG. 3B is a graphical representation of signals generated by touch sensors of the wearable electronic device of FIG. 3A and respective threshold signal levels.

FIG. 3B depicts a graphical representation of a plurality of signal levels 330 of touch signals generated by the plurality of touch sensors 322-328 and received by the processor 150 when neither the first and second watch hands 310, 312, nor a user's finger of style are proximate to the touch panel 320. More specifically, FIG. 3B depicts a first signal level 332 of a touch signal generated by the first touch sensor 322, a second signal level 334 of a touch signal generated by the second touch sensor 324, a third signal level 336 of a touch signal generated by the third touch sensor 326, and a fourth signal level 338 of a touch signal generated by the fourth touch sensor 328.

FIG. 3B also depicts a plurality of thresholds 340 stored in memory 150 that are each utilized by processor 150 to determine whether a touch input was received from a user by the touch panel 320. Specifically, thresholds 340 are touch signal levels that the processor 150 may determine are exceeded by signal levels 330 to determine whether a touch input was received from a user. The processor 150 may determine a touch input has been received by touch panel 320 in corresponding touch zones if the first signal level 332 exceeds a first threshold 342, the second signal level exceeds a second threshold 344, the third signal level 336 exceeds a third threshold 346, or the fourth signal level 338 exceeds a fourth threshold 348. As described above, the processor 150 may retrieve each of the plurality of thresholds 340 from memory 150 or determine or adjust each of the plurality of thresholds 340 based on the determined positions or locations of the first and second watch hands 310, 312. In embodiments, the processor 150 may determine the position or location of the first and second watch hands 310, 312 based on position signals received from a watch hand position sensor or actuation apparatuses 128, 129, which drive a current position of the first and second watch hands 310, 312. The processor 150 may control the first watch hand actuation apparatus 128 and the second watch hand actuation apparatus 129 to rotate each of the first and second watch hands 310, 312 in a clockwise or a counter-clockwise direction by any extent.

As shown in FIG. 3A, neither of the first or second watch hands 310, 312 are proximate to or overlie touch panel 320. As such, processor 150 may determine and the memory 152 may store a baseline for touch signals received from the touch panel 320 for use with determining whether subsequent touch signals received from the touch panel 320 correspond to a touch input received from a user. Furthermore, there is no object touching or proximate to the watch face 304, such as a user's finger or stylus. Accordingly, each of the plurality of signal levels 330 are relatively low and below their respective thresholds of the plurality of thresholds 340.

Figure 3C:
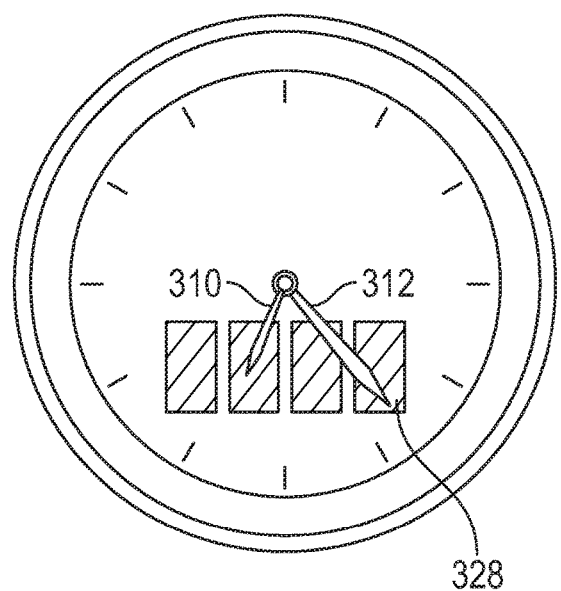
FIG. 3C is a top plan view of the wearable electronic device of FIG. 1A illustrating the watch hands positioned proximate to the touch sensors.
Figure 3D:
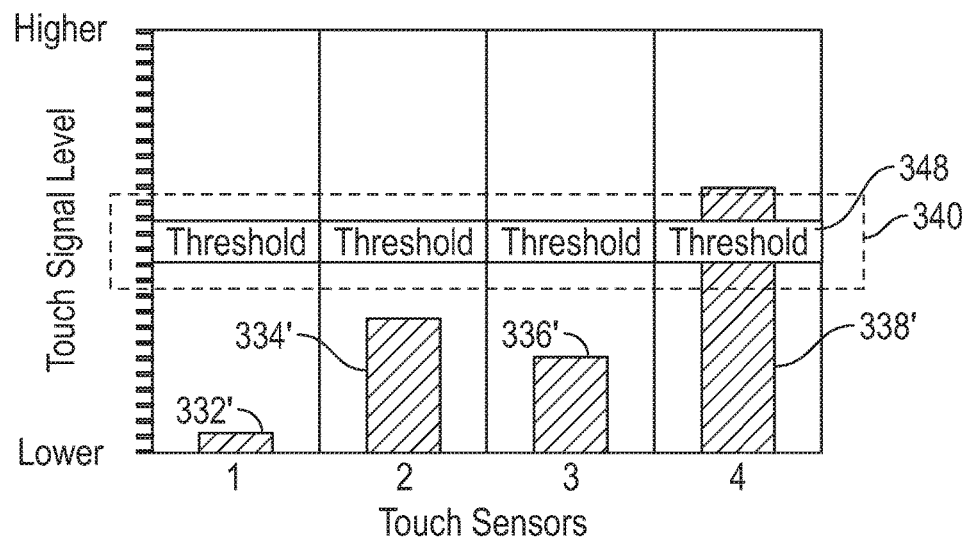
FIG. 3D is a graphical representation of signals generated by touch sensors of the wearable electronic device of FIG. 3C and respective signal thresholds.

In comparison, as shown in FIG. 3C, the first and second watch hands 310, 312 have rotated to be proximate to touch panel 320. As shown in FIG. 3D, the second, third, and fourth signal levels 334', 336', 338' for touch signals output by touch sensors 324, 326, 328, respectively, reflect the proximity of the first and second watch hands 310, 312 to the touch panel 320. Indeed, the proximity of the second watch hand 312 to the fourth touch sensor 328 has yielded the fourth signal level 338', which exceeds the fourth threshold 348, which the processor 150 could utilize and thereby falsely determine that a touch input has been received from a user.

Figure 3E:
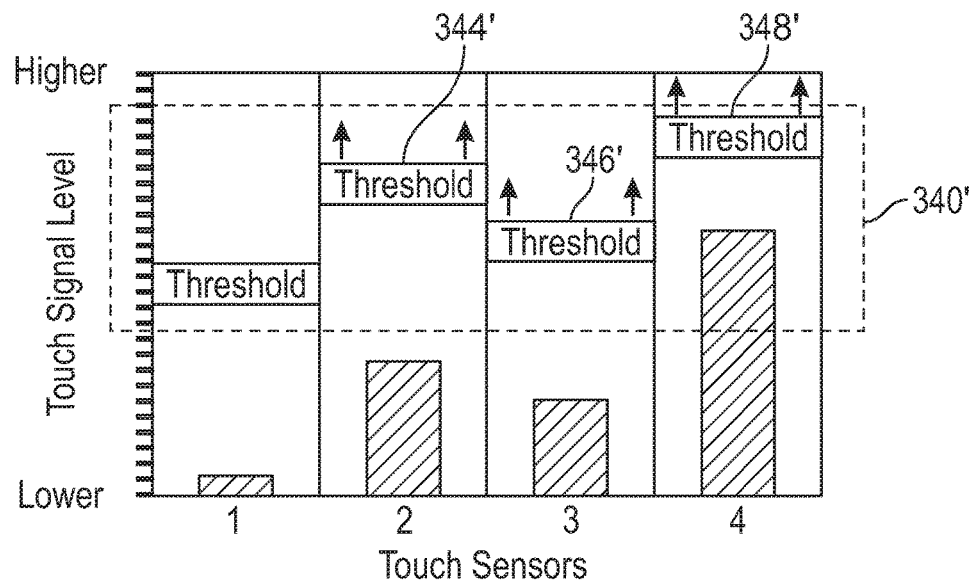
FIG. 3E is a graphical representation of the signals generated by touch sensors of the wearable electronic device in FIG. 3C where the signal thresholds have been adjusted responsive to the position of the watch hands proximate to the touch sensors.

In embodiments, the processor 150 may adjust one or more of the plurality of thresholds 340 to account for the current positions of the first and second watch hands 310, 312, depicted in FIG. 3C. For example, FIG. 3E depicts adjusted second, third, and fourth signal levels 334', 336', 338' determined by processor 150 or retrieved from memory 152 to correspond to the signal levels generated by the touch panel 320 when the first and second watch hands 310, 312 shown in FIG. 3D. As seen in FIG. 3E, the processor 150 determines a plurality of adjusted signal thresholds 340' that are greater than the first, second, third, and fourth signal levels 332', 334', 336', 338' for touch signals output by touch sensors 322, 324, 326, 328, respectively, when the first and second watch hands 310, 312 are in the positions shown in FIG. 3D. The processor 150 may increase or decrease the second, third, and fourth thresholds 344', 346', 348' responsive to the position of the watch hands by a predetermined amount such that the signal level necessary to indicate a touch input has accounted for the current position of the first and second watch hands 310, 312. As a result of adjusting these signal thresholds, the processor 150 will not identify a touch input to the fourth touch sensor 328 because the fourth signal level 338' no longer exceeds the adjusted fourth threshold 348'.

Figure 3F:
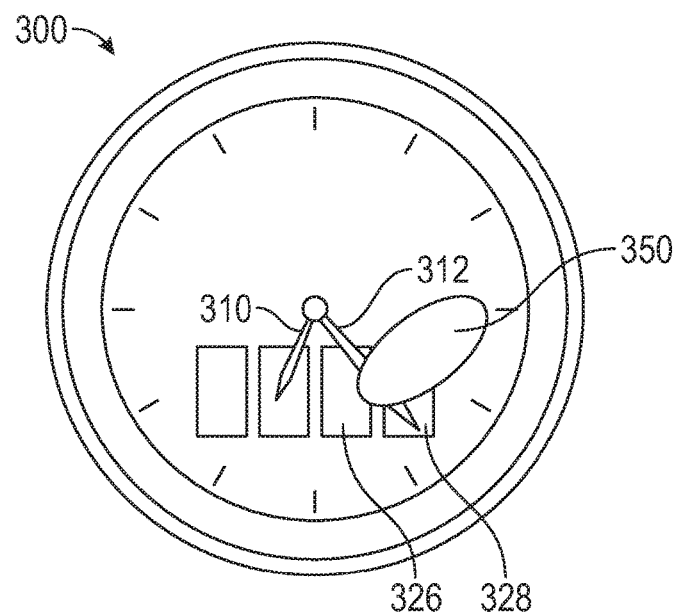
FIG. 3F is a top plan view of the wearable electronic device of FIG. 1A illustrating the watch hands positioned proximate to the touch sensors and a representation of an area where a touch input being made by a user.
Figure 3G:
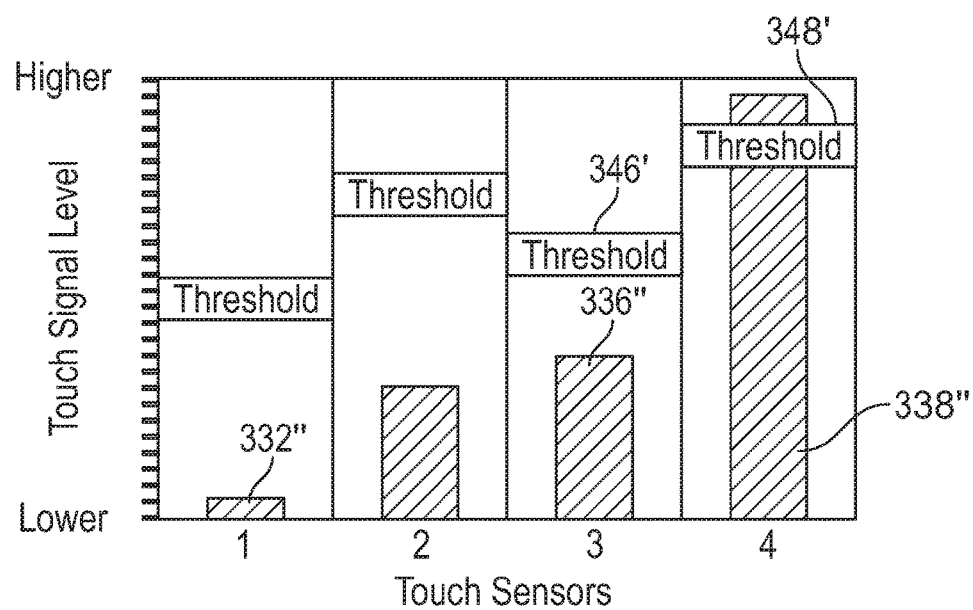
FIG. 3G is a graphical representation of signals generated by touch sensors of the wearable electronic device of FIG. 3F and respective signal thresholds adjusted responsive to the position of the watch hands proximate to the touch sensors to identify the touch input.

A touch input received from a user's finger or style will increase a signal level of one or more touch sensors 322-328 of the touch panel 320. For example, as shown in FIG. 3F, a user input 350 is applied to the watch face 304 in a region proximate to the third and fourth touch sensors 326, 328 while the first and second watch hands 310, 312 in the same positions as illustrated in FIG. 3C. FIG. 3G depicts third and fourth signal levels 336", 338" that are increased relative to the third and fourth signal levels 336, 338 shown in FIG. 3D, which correspond to signal levels generated by the touch panel 320 when the first and second watch hands 310, 312 are the positions shown in FIG. 3C. FIG. 3G also depicts the plurality of adjusted signal thresholds 340', which are greater than the first, second, third, and fourth signal levels 332', 334', 336', 338' for touch signals output by touch sensors 322, 324, 326, 328, respectively, when the first and second watch hands 310, 312 are the positions shown in FIG. 3C. While the third signal level 336" does not exceed the third adjusted signal threshold 346', the fourth signal level 338" exceeds the fourth adjusted signal threshold 348'. The processor 150 may utilize this determination to conclude that a touch input has been received from a user in an area corresponding to the fourth touch sensor 328.

Figure 3H:
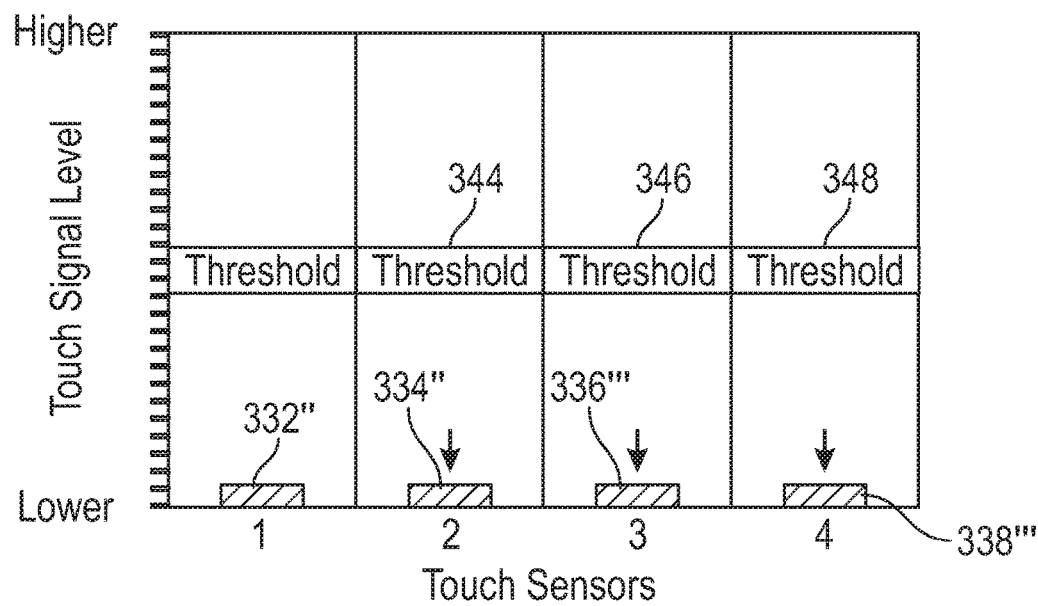
FIG. 3H is a graphical representation of the signals generated by touch sensors of the wearable electronic device in FIG. 3F having been normalized responsive to the position of the watch hands proximate to the touch sensors.

In some embodiments, the processor 150 may normalize one or more touch signals received from the touch panel 320 by increasing or decreasing the level of the touch signals responsive to the determined positions of the first and second watch hands 310, 312. The processor 150 may normalize the touch signals in addition to or as an alternative to adjusting the signal thresholds, as described above. FIG. 3H depicts such a normalization performed by the processor 150 responsive to the positions of the first and second watch hands 310, 312 as positioned in FIG. 3C. Specifically, the second, third, and fourth normalized signal levels 334", 336''', 338''' are shown as having been selected signal levels for touch signals received from the second, third, and fourth touch sensors 324, 326, 328 responsive to the positions of the first and second watch hands 310, 312 being positioned as shown in FIG. 3C. As seen in FIG. 3H, the normalization performed by the processor 150 may decrease a signal level of the touch signals received from touch signals 334, 336, 338 in comparison to the respective signal thresholds 344, 346, 348 and thereby not result in a touch input being identified as received by the fourth touch sensor 328.

Figure 3I:
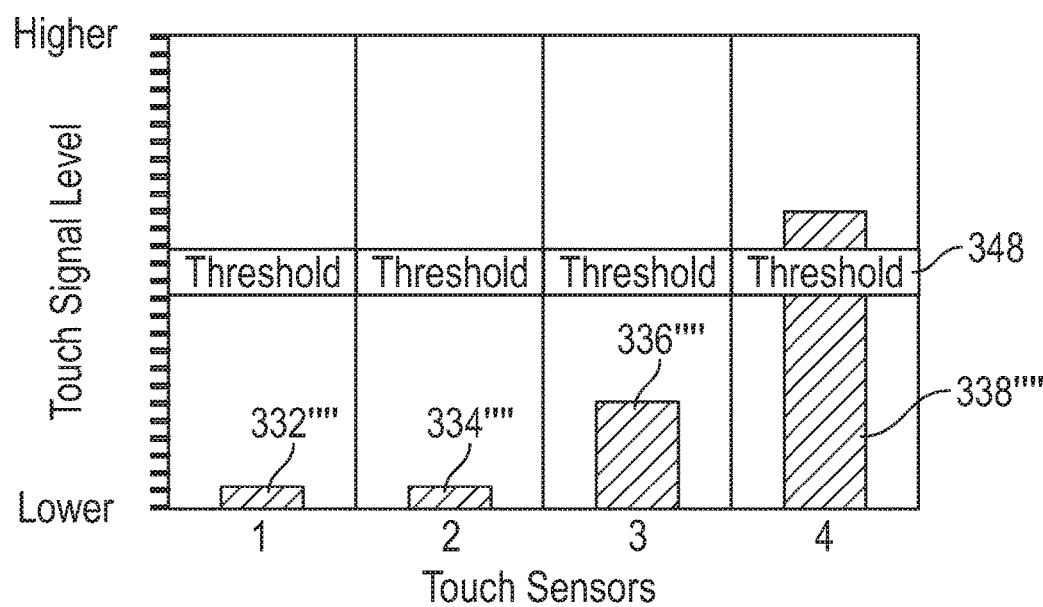
FIG. 3I is a graphical representation of the normalized signals generated by touch sensors of the wearable electronic device in FIG. 3F and respective signal thresholds to identify the touch input.

The processor 150 may identify a touch input to the watch face 304, as shown in FIG. 3F, based on touch signals received from touch panel 320 that have been normalized by implementing techniques similar to those described above. As shown in FIG. 3I, the third and fourth normalized signal levels 336"", 338"" responsive to the user input shown in FIG. 3F result in the fourth normalized signal level 338"" exceeding the fourth signal threshold 348 and the processor 150 thereby identifying a touch input received by the fourth touch sensor 328. The first signal level 332"" and the second normalized 334"" remain unchanged in FIG. 3I (compared to FIG. 3H) because the user's finger is not proximate to the first touch sensor 322 or the second touch sensor 324.

Figure 4A:
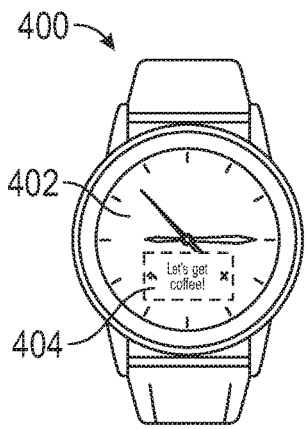
FIGS. 4A-4D are top plan views of the wearable electronic device of FIG. 1A illustrating embodiments of the invention wherein approximately half of a watch face of the wearable electronic device comprises a display and touch panel.

Referring now to FIGS. 4A-E, embodiments of the invention with varying displays and touch panels covering approximately one-half of a watch face are presented. For example, FIG. 4A depicts a watch 400 having a watch face 402, a display 404 that is located on a lower half of the watch face 402, and a touch panel positioned so as to overlay, and in some embodiments be coextensive with, the display 404.

Figure 4B:
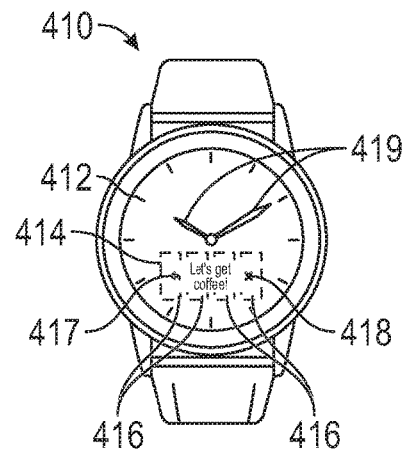
Figure 4C:
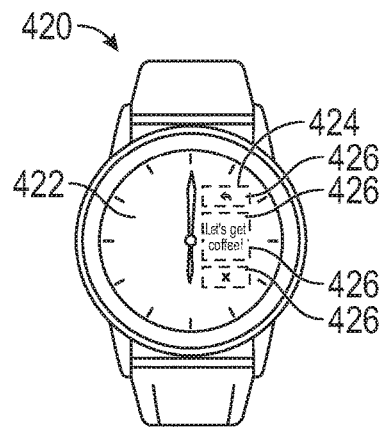

Similarly, FIG. 4B depicts a watch 410 with a watch face 412, a display 414 that is positioned on a lower half of the watch face 412, and a touch panel comprising a plurality of touch sensors 416. FIG. 4C depicts a watch 420 comprising a watch face 422, a display 424 positioned on a right half of the watch face 422, and a touch panel comprising a plurality of touch sensors 426.

Processor 150 may control display 414 and 424 to present information that may be selected to correspond with a plurality of touch zones corresponding to touch sensors 416 and 426 such that a touch input from a user to one of the plurality of touch zones may indicate an instruction or selection from the user. In the embodiment presented in FIG. 4B, processor 150 controls the display 414 to present the text "Let's get coffee!," a first user interface element 417 associated with an available function (e.g., reply to message, navigate back, scroll up, scroll down, etc.), and a second user interface element 418 associated with an available function (e.g., close message, navigate back, scroll up, scroll down, etc.). The first user interface element 417 may be positioned within the display 414 in an area associated with one touch zone associated with a touch sensor 416 and the second user interface element 418 may be positioned within the display 414 in another area associated with a different touch zone associated with a touch sensor 416. Accordingly, when the processor 150 determines that a touch input has been received in a touch zone associated with the first user interface element 417, the processor 150 may execute a function associated with the second user interface element, such as responding to the "Let's get coffee!" message, navigate back, scroll up, scroll down, and so forth. Similarly, when the processor 150 determines that a touch input has been received in a touch zone associated with the second user interface element 418, the processor 150 may execute a function associated with the second user interface element, such as clearing the "Let's get coffee!" message, navigate back, scroll up, scroll down, and so forth. A benefit of processor 150 more accurately identifying touch inputs provided by the user enables the processor 150 to improve a user experience by differentiating between intended touch inputs and false (erroneous) touch inputs resulting from a position of watch hands 419 of the watch 410. In embodiments, as shown in FIGS. 7A-7F, the processor 150 may control display 414 to present information such that content and information is presented utilizes two or more regions of watch face 412 resulting from the position of watch hands 419.

In embodiments, the processor 150 may control display 414 to present user interface elements available for selection in a location that corresponds to (overlaps) two or more touch zones corresponding two or more touch sensors. For example, the first user interface element 417 (a back arrow) may be positioned between the first and second touch zones corresponding to the two touch sensors 416 to the left and the processor 150 may utilize touch signals received from both touch sensors 416 to identify a touch input intending to select the first user interface element 417. Alternatively, in embodiments, the processor 150 may define one or more new touch zones based on the user interface elements or content presented on the display 414. For example, the processor 150 may define a new touch zone by utilizing the two touch zones associated with the two touch sensors 416 on the left.

Figure 4D:
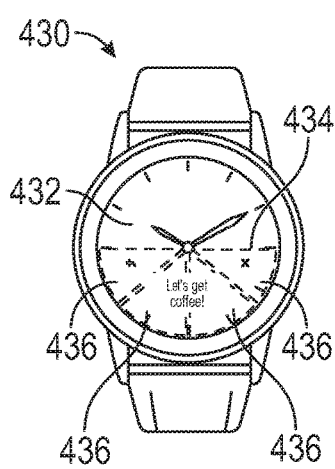
Figure 4E:
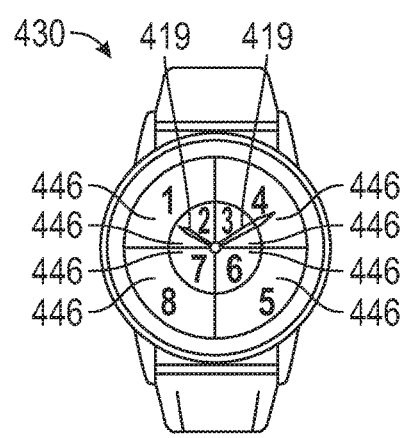
FIG. 4E is a graphical representation of the wearable electronic device of FIG. 1A illustrating embodiments of the invention wherein the touch sensors are positioned such that the watch hands of the wearable electronic device may be positioned over some of the touch sensors.

As seen in FIGS. 4A-4C, the displays 404, 417, and 424 of watches 400, 410, and 420, respectively, may correspond to less than one-half of the watch faces 402, 412 and 422, respectively. In other embodiments, as shown in FIG. 4D, a watch 430 may comprise a watch face 432, a display 434 positioned on and substantially covering a lower half of the watch face 412, and a touch panel comprising a plurality of touch sensors 436. A plurality of touch zones corresponding to touch zones 436 may occupy substantially the entire lower half of the watch face 432. Additionally, the plurality of touch sensors 436 may have a geometric configuration that conforms to a geometry of the watch face 432. As shown in FIG. 4D, the touch sensors 436 have a wedge-shaped geometric configuration conforming to the circular geometry of the watch face 432. And, as shown in FIG. 4E, the touch sensors 446 may be split such that some of the touch sensors 446 can be physically obscured by the longer hour hand 419 but cannot be physically obscured by the shorter hour hand 419. It is to be understood that any geometric configuration of touch sensors is contemplated and included within the scope of the invention, including, but not limited to, rectangular, square, wedge, triangular, circular, elliptical, ovular, semi-circular, annular, semi-annular, and the like. Moreover, while the plurality of touch sensors 416, 426, 436 are depicted as being of uniform size and shape, touch sensors 416, 426, 416 may be of differing size and shape may be included within a touch panel of a watch.

Referring now to FIGS. 5A-5H, embodiments of the invention with varying displays and touch panels covering substantially an entirety of a watch face of the watch are presented. For example, FIG. 5A depicts a watch 500 comprising a first display 504 and a second display 505 located on respective portions of upper and lower halves of a watch face 502. Two touch panels may be positioned so as to overlay, and in some embodiments be coextensive with, the displays 504, 505.

In FIGS. 5B-5H, a display 507 occupies substantially the entirety of the watch face 502. For example, FIG. 5B depicts the watch 500 where a touch panel 506, which includes a plurality of touch sensors, and a display 507 occupy substantially the entirety of the watch face 502. FIG. C depicts an embodiment of the watch 500 where the touch panel 506 includes four wedge-shaped touch sensors that collectively cover substantially the entirety of the watch face 502. FIG. 5D depicts an embodiment of the watch 500 where the touch panel 506 comprises eight wedge-shaped touch sensors that collectively cover substantially the entirety of the watch face 502. FIG. 5E depicts an embodiment of the watch 500 where the touch panel 506 comprises eight touch sensors that are vertically oriented, such that one end of each touch sensor is flat and adjacent a center line of the watch face 502 and the other end of each touch sensor is curved to conform to the perimeter of the watch face 502. FIG. 5F depicts an embodiment of the watch 500 where the touch panel 506 comprises a first subset of four touch sensors 511, which are positioned in an upper half of the watch face 502 and having a configuration the same as the touch zones shown in FIG. 5E, and a second subset of four touch sensors 512, which are positioned in a lower half of the watch face 502 and having a wedge-shaped configuration similar to the touch sensors depicted in FIG. 5D. FIG. 5G depicts an embodiment of the watch 500 where the touch panel 506 comprises a plurality of rectangular touch sensors of varying size and proportion, covering substantially the entirety of the watch face 502. FIG. 5H depicts an embodiment of the watch 500 where two touch panels 506 each including a subset of touch sensors 511.

In some embodiments, the touch panel 506 and the display 507 may exclude a center region of the watch face 502, within which mechanisms related to the rotation of watch hands 508, 509 may pass through the watch face 502 and be positioned to rotate the watch hands 508, 509. For example, the touch panel 506 and the display 507 may have an opening at the center of the watch face 502 through which the mechanisms, such as the drive shafts 202-206 may pass to couple with the watch hands 508, 509.

Figure 6A:
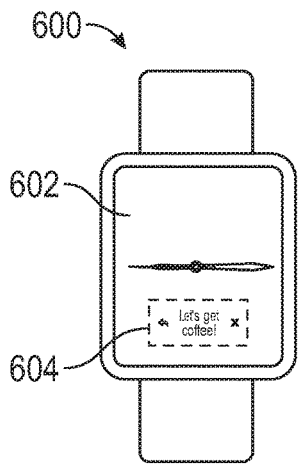
FIGS. 6A-6E are top plan views of the wearable electronic device of FIG. 1A illustrating embodiments of the invention wherein the wearable electronic device comprises a rectangular watch face.
Figure 6B:
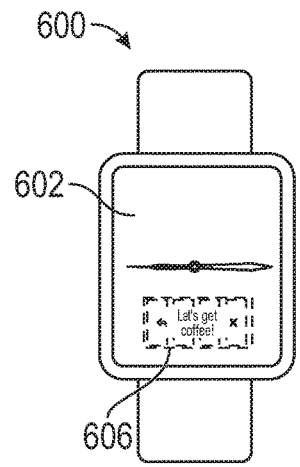

Referring now to FIGS. 6A-6E, embodiments of the invention directed toward watches having rectangular housings and watch faces are presented. Referring now specifically to FIGS. 6A-B, a rectangular watch 600 comprising a watch face 602 may include a display 604 positioned in a portion of a lower half of the watch face 602 and a touch panel 606 comprising a plurality of rectangular touch sensors positioned and configured to overlie and be coextensive with the display 604, such that each of the display 604 and the touch panel 606 occupy about half of the watch face 602. Alternative embodiments may include displays and touch panels configured to occupy an upper half of the watch face, a left half of the watch face, and a right half of the watch face.

Figure 6C:
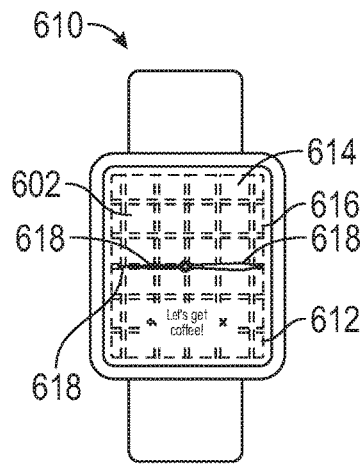
Figure 6D:
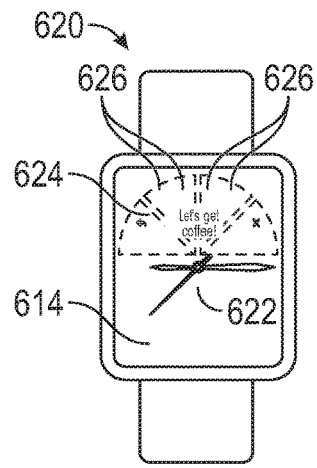
Figure 6E:
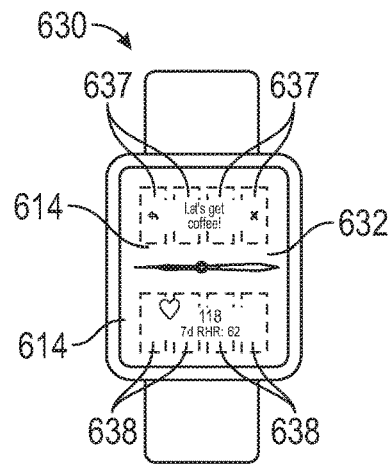

In FIGS. 6C-6E, a display 614 occupies substantially the entirety of the watch face 612. For example, FIG. 6C presents a rectangular watch 610 according to another embodiment of the invention comprising a watch face 612, a display 614 occupying substantially all of the watch face 612, and a touch panel 616 comprising a plurality of touch sensors collectively covering substantially all of the watch face 612, such that the display 614 and the touch panel 616 are generally coextensive. In embodiments, the processor 150 may control the position of watch hands 618 (hour, minute, and second watch hands) to create two or more regions of the watch 612, each region presenting information not presented in other region(s) of the watch face 612.

FIG. 6D depicts a rectangular watch 620 according to an embodiment of the invention comprising a watch face 622, a display 614 positioned in an upper half of the watch face 622, and a touch panel 624 comprising a plurality of wedge-shaped touch sensors 626 positioned in the upper half of the watch face 622. FIG. 6E depicts a rectangular watch 630 according to an embodiment of the invention comprising a watch face 632, a display 614 occupying substantially the entirety of the watch face 632, and a first touch panel comprising rectangular touch sensors 637 positioned in an upper half of the watch face 632 and a second touch panel comprising rectangular touch sensors 638 positioned in a lower half of the watch face 632.

Additionally, each of the display 614 and the touch panels 616, 624 may exclude a center portion of the watch face 612, 622, 632, respectively, within which mechanisms related to the rotation of watch hands 618 may pass through the watch face 612, 622, 632 and be positioned to rotate the watch hands 618. For example, the touch panel 616, 624 and the display 614 may have an opening at the center of the watch face 612, 622, 632 through which the mechanisms, such as the drive shafts 202-206 may pass to couple with the watch hands 618. While watches having circular and rectangular watch faces have been presented, watch faces of any shape are contemplated and included within the scope of the invention.

The processor 150 may control display 140 to present information such that content and information is presented utilizes two or more regions of watch face 104 resulting from the position of watch hands 120, 122. In some embodiments, the processor 150 may control the first watch hand actuation apparatus 128 and the second watch hand actuation apparatus 129 to rotate each watch hand 120, 122 to a desired position to create or otherwise frame a region to serve as a display section. In other embodiments, the processor 150 may control the first watch hand actuation apparatus 128 and the second watch hand actuation apparatus 129 to rotate each watch hand 120, 122 to indicate a current time and the processor 150 may control display to present information within regions of watch face 104 formed by the position of watch hands 120, 122.

As shown in FIGS. 7A-7F, at least two regions are formed a current position of the hour and minute watch hands 120, 122 based on a current time. The processor 150 of watch 700 may control the display 140 to present information in each region formed by the watch hands 120, 122. The processor 150 of the watch 700 may be configured to, upon receiving an input from the user, present information in a display section and to position the watch hands 706 so as to frame or otherwise draw the user's attention to the display section.

Figure 7C:
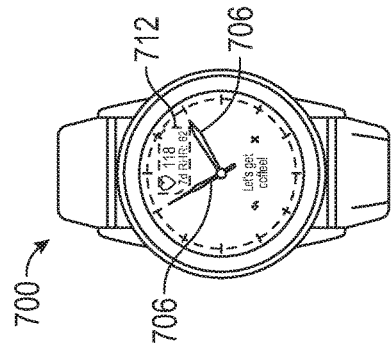
FIGS. 7A-7F are top plan views of the wearable electronic device of FIG. 1A illustrating embodiments of the invention wherein watch hands of the wearable electronic device are positioned responsive to information presented on a display of the device.
Figure 7F:
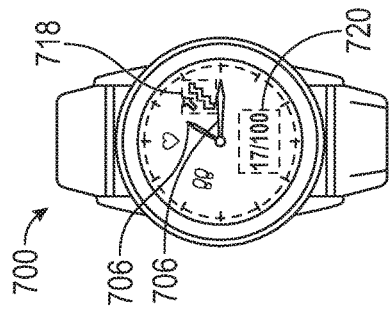
Figure 7B:
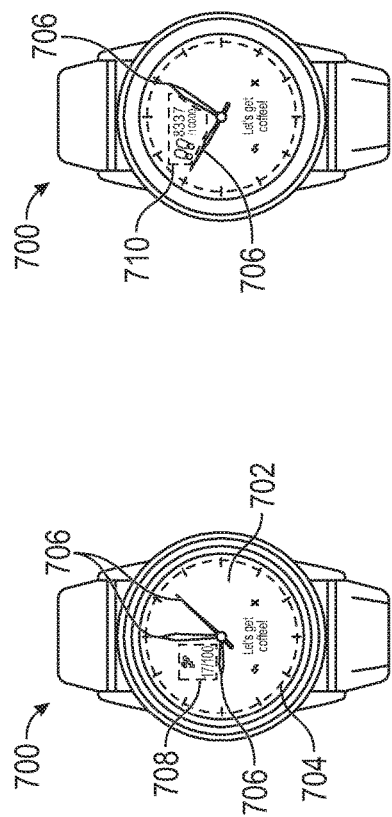
Figure 7E:
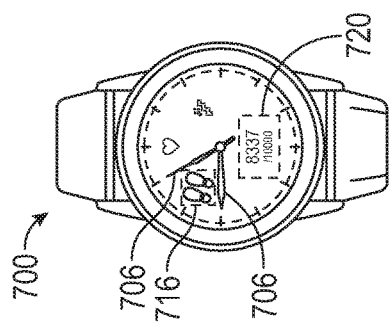
Figure 7A:
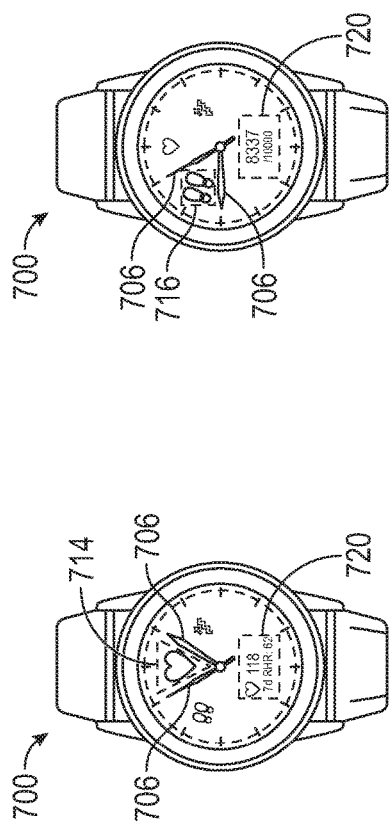

For example, FIG. 7A depicts a watch 700 including a watch face 702, a display 704 that occupies substantially an entirety of the watch face 702, and a plurality of watch hands 706. A first display section 708 of the display 704 is formed by hour and minute watch hands 706 pointing to 9:00, either to indicate a current time or to create the first display section 708, within which the processor 150 may control the display 704 to present information to the user, in this instance, an icon indicating climbing stairs, a number representing the number of flights of stairs climbed, and another number indicating a determined target number of flights of stairs for the user to climb.

Similarly, FIG. 7B depicts the watch 700 where a second display section 710 is formed by the hour and minute watch hands 706 and the processor 150 may control the display 704 to present information to the user within the second display section 710, in this instance, shoe icons, a number representing the number of steps the user has taken, and a number representing a target number of steps for the user. FIG. 7C depicts the watch 700 where a third display section 712 is formed by the hour and minute watch hands 706 and the processor 150 may control the display 704 to present information to the user within the second display section 710, in this instance, a heart, a number representing a most recent heart rate measured for the user, and a seven-day average resting heart rate for the user. Again, in embodiments, the position of the watch hands 706 may frame or otherwise draw the user's attention to the third display section 712.

Figure 7D:
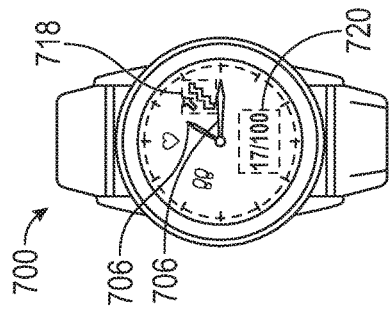

FIGS. 7D-7F identify a second display second formed by the position of the watch hands 706. Specifically, the watch 700 includes a fourth, fifth, and sixth display sections 714, 716, 718 utilized by the processor 150 to display, respectively, heart, shoe, and stair icons, and a seventh display section 720 utilized by the processor to display additional information. Specifically, FIG. 7D depicts the watch hands 706 framing or otherwise indicating the fourth display section 714, including a heart icon, as well as the seventh display section 720 displaying information relating to the user's heart rate. FIG. 7E depicts the watch hands 706 framing or otherwise indicating the fifth display section 716 as well as the seventh display section 720 displaying information relating to the number of steps the user is determined to have taken. FIG. 7F depicts the watch hands 706 framing or otherwise indicating the sixth display section 718 as well as the seventh display section 720 displaying information relating to the number of stair cases the user is determined to have climbed.

Figure 8:
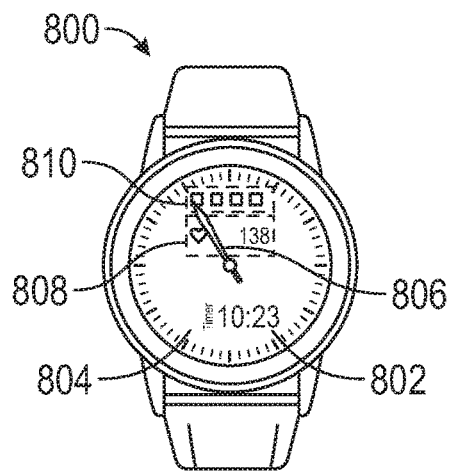
FIG. 8 is a top plan view of the wearable electronic device of FIG. 1A illustrating an embodiment of the invention demonstrating another method of positioning watch hands of a wearable electronic device responsive to information presented on a display of the device.

In embodiments, the processor 150 may control the first watch hand actuation apparatus 128 and the second watch hand actuation apparatus 129 to control watch hands 120, 122 and serve as a pointer to convey information to a user relating in association with a watch face 104. For example, FIG. 8 depicts a watch 800 comprising a watch face 802, a display 804 that occupies substantially an entirety of the watch face 802, and watch hands 806. The watch face 802 may include a first display section 808 presenting information about a heart rate of the user, and a second display section 810 presenting a plurality of indicators, such as color-coded indicators, that may relate to the information displayed in the first display section 808. The processor 150 may control the position the watch hands 806 so as to point to a position within the second display section 810 to indicate a parameter or value. For example, the second display section 810 may assist a user with determining whether the user's determined heart rate is within a desired or undesired range, with the color scheme of the color-coded indicators of the second display section 810 conveying such meaning to the user. It is to be understood that while heart rate information is shown, any other type of information, including biometric and exercise information about the user, is contemplated and included as part of the invention as being displayed in the first and second display sections 808, 810 with the watch hands cooperating with at least one of the first and second display sections 808, 810 to convey such information.

Figure 9A:
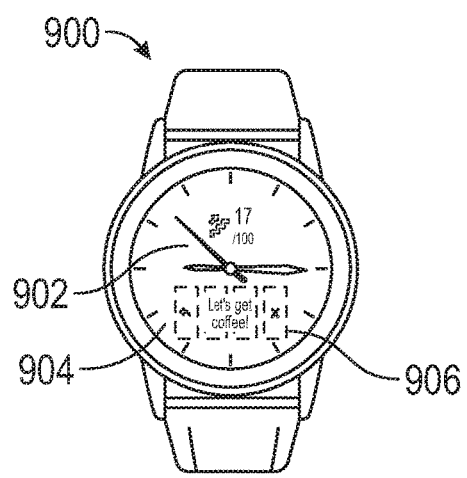
FIGS. 9A-9B are top plan views of the wearable electronic device of FIG. 1A illustrating embodiments of the invention wherein substantially all of a watch face of the wearable electronic device comprises a display and approximately half of a watch face of the wearable electronic device comprises a touch panel.
Figure 9B:
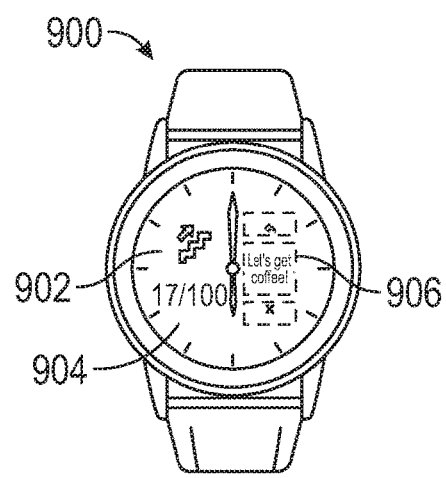

In embodiments, the watch 100 may include watch hands 120, 122, a watch face 104, a display 140 covering substantially all of the watch face 104, and a touch panel 118 covering less than the entirety of the watch face 104. For example, FIGS. 9A-B present embodiments of the invention wherein a watch 900 comprises a watch face 902, a display 904 that occupies substantially an entirety of the watch face 902, and a touch panel 906 that occupies only a portion of the watch face 902. FIG. 9A depicts a touch panel 906 occupying a portion of a lower half of the watch face 902. FIG. 9B depicts a touch panel 906 occupying a portion of a right half of the watch face 902. It is contemplated and included within the scope of the invention that a watch having a display occupying substantially all of a watch face may also include a touch panel occupying any portion of the watch face.

In embodiments, the processor 150 may operate in a first operating mode in which the touch input feature is disabled (e.g., by disabling touch panel 118, not analyzing touch signals received from one or more touch sensors 136 of the touch panel 118, etc.) and the first and second watch hand actuation apparatuses 128, 129 are controlled to rotate (move) the watch hands 120, 122 to provide a time of day. The processor 150 may operate in a second operating mode in which the touch input feature is enabled (e.g., by enabling touch panel 118, analyzing touch signals received from one or more touch sensors 136 of the touch panel 118, etc.) and the first and second watch hand actuation apparatuses 128, 129 are controlled to rotate (move) the watch hands 120, 122 to a predetermined location on the watch face 104 that is not proximate to the one or more touch sensors 136 of the touch panel 118.

Figure 10A:
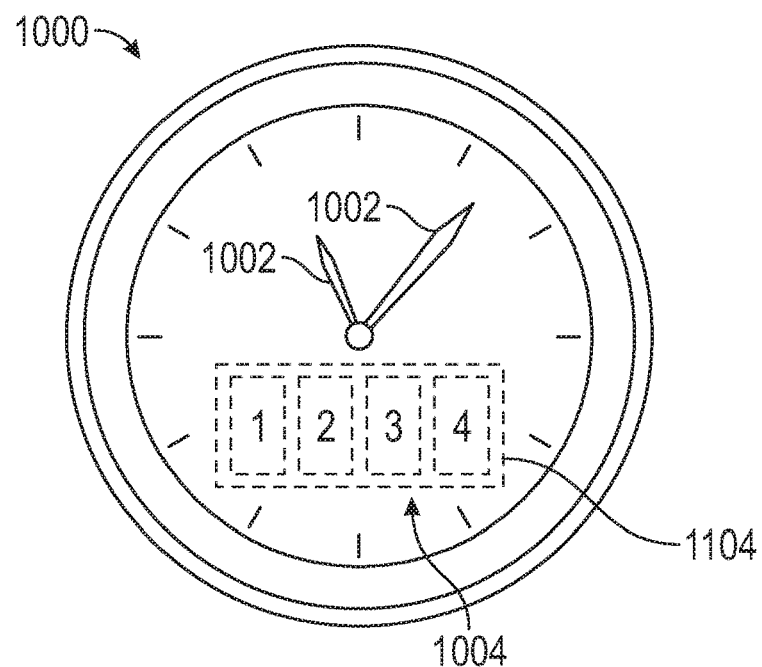
FIGS. 10A-10C are top plan views of the wearable electronic device of FIG. 1A illustrating a touch panel-disabling feature.
Figure 10B:
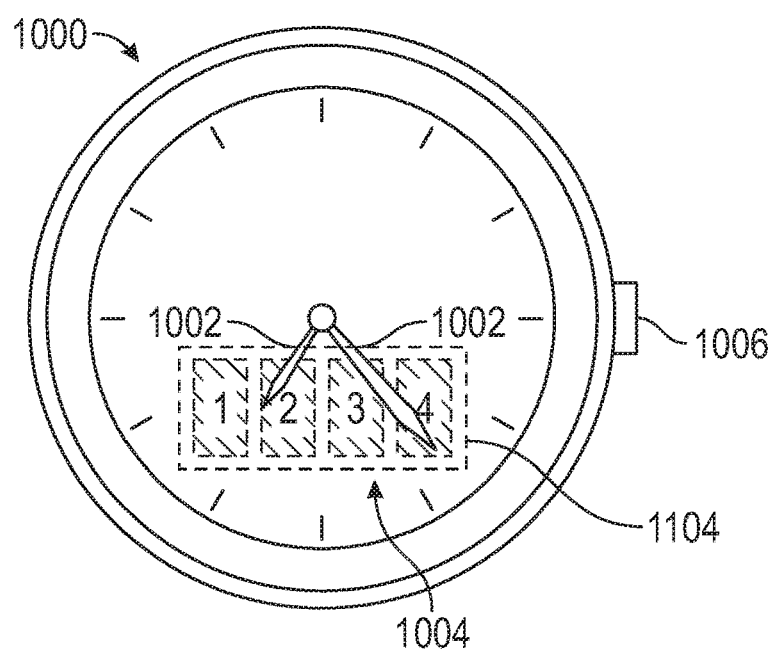

In other embodiments, the processor 150 may control the first and second watch hand actuation apparatuses 128, 129 to rotate (move) the watch hands 120, 122 to provide a time of day and disable the touch input feature (e.g., by disabling touch panel 118, not analyzing touch signals received from one or more touch sensors 136 of the touch panel 118, etc.) once the processor determines that the watch hands 120, 122 are located proximate to one or more touch sensors 136 of the touch panel 118. If the processor 150 determines that the user desires to use the touch input feature, such as by receiving motion signals having a predetermined motion signature stored in memory, the processor 150 may enable the touch input feature (e.g., by enabling touch panel 118, analyzing touch signals received from one or more touch sensors 136 of the touch panel 118, etc.) and control the first and second watch hand actuation apparatuses 128, 129 to rotate (move) the watch hands 120, 122 to a predetermined location on the watch face 104. For example, FIGS. 10A-10D depict watches configured to selectively enable and disable a touch panel thereof responsive to the position of watch hands. Specifically, FIG. 10A shows a watch 1000 comprising watch hands 1002 being controlled by processor 150 to provide a current time of day and a touch panel 1004 comprising a plurality of touch sensors. The watch hands 1002 are positioned generally away from the touch panel 1004, and therefore the touch sensors of the touch panel 1004 are enabled by the processor 150 to receive touch inputs from the user. In comparison, FIG. 10B depicts the watch hands 1002 being positioned generally proximate to the touch panel 1004 while providing a current time of day. The processor 150 may determine the current location of the watch hands 1002 and disable the touch panel 1004 such that the processor 150 will not identify touch inputs provided to touch panel 1004. The watch 1000 further comprises a rotatable and/or depressible user input device 1006, such as a watch crown.

Figure 10C:
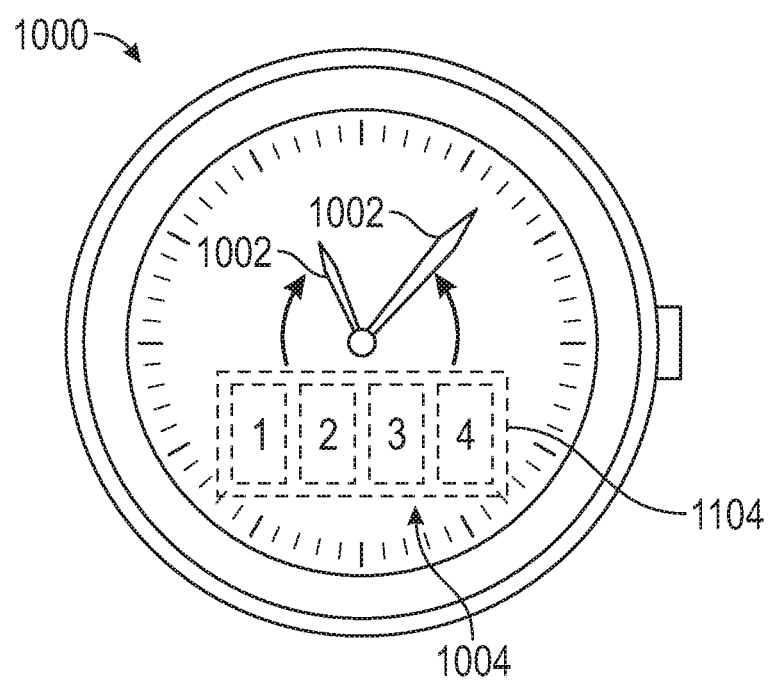

The processor 150 may determine that the user desires to provide an input by utilizing the touch input feature based on motion signals received from a motion sensor (e.g., accelerometer, gyroscope, etc.) enclosed within the housing 102 of watch 1000. For example, the processor 150 may utilize a motion signature, such as motion signals typically associated with a double tap provided to the housing 102 by a user, or a motion threshold, such as a magnitude of motion signals typically exceeded by a double tap provided to the housing 102 by the user, stored in memory 152 to determine that the user desires to provide an input by utilizing the touch input feature. The processor 150 may enable the touch input feature (e.g., by enabling touch panel 118, by analyzing touch signals received from one or more touch sensors of the touch panel 1004, etc.) and control the first and second watch hand actuation apparatuses 128, 129 to rotate (move) the watch hands 1002 away from the touch panel 1004. As shown in FIG. 10C, the processor 150 is controlling the first and second watch hand actuation apparatuses 128, 129 to rotate (move) the watch hands 1002 away from the touch panel 1004. Such a function may supplement the adjustment of the signal thresholds or normalization of the touch signals as described hereinabove. Such a function may additionally facilitate the visibility of information presented on a display of the watch 1000 that is co-located with the touch panel 1004 by rotating the watch hands 1002 away from such a display.

Figure 11B:
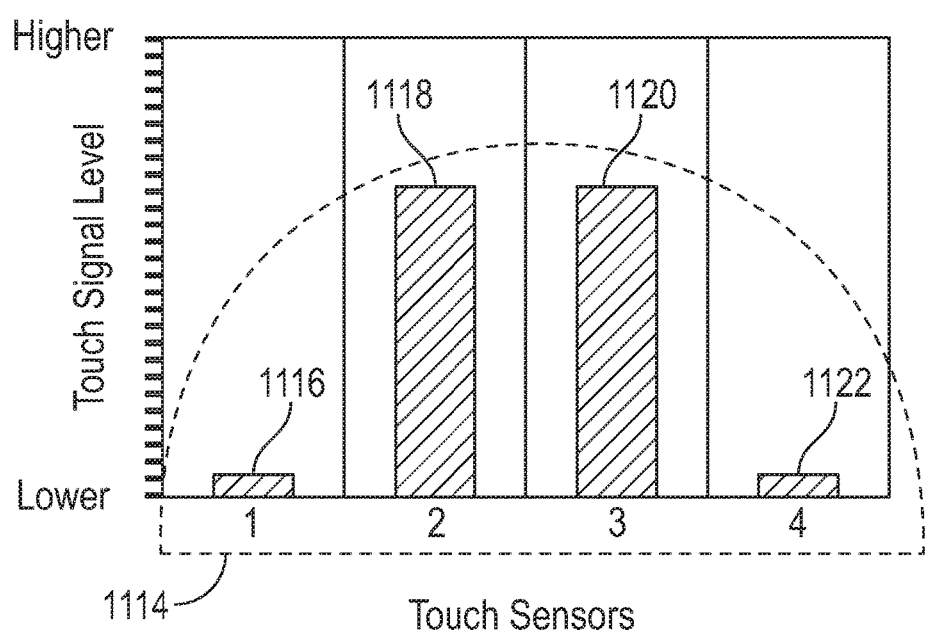
FIG. 11B is a graphical representation of signals generated by touch sensors of the wearable electronic device of FIG. 11A.

In embodiments, the processor 150 may determine a current location of the watch hands 120, 122 based on signals received from one or more sensors configured to output signals indicative of a proximity of the watch hands 120, 122 to the one or more sensors. In other embodiments, the processor 150 may control the first and second watch hand actuation apparatuses 128, 129 to rotate (move) the watch hands 120, 122 to a predetermined location within the touch panel 1004. The processor 150 may utilize one or more touch signal levels stored in the memory 152 associated with the predetermined location of the watch hands 120, 122. Calibration operations may be performed in order to determine at least one of the position of watch hands and the functionality of touch sensors, including whether they are generating touch signals as expected. For example, FIGS. 11A-11B illustrate implementation of a calibration function according to embodiments of the invention. Watch 1100 comprises watch hands 1102 and a plurality of touch panel 1104, specifically first, second, third, and fourth touch sensors, 1106, 1108, 1110, 1112. The processor 150 may rotate the watch hands 1102 to any predetermined position such that each watch hand 1102 are positioned at a known location within touch panel 1104. In this example, the watch hands 1102 have been moved to a predetermined location at 6:00 such that the watch hands 1102 are positioned between the second and third touch sensors 1108, 1110. FIG. 11B presents a graph of a plurality of touch signals 1114, specifically, output by the first, second, third, and fourth touch signals 1116, 1118, 1120, 1122 received from the first, second, third, and fourth touch sensors 1106, 1108, 1110, 1112, respectively. The second and third touch signals 1118, 1120 both have a signal level significantly greater than the first and fourth signal levels 1116, 1122, and they are equal to one another. The processor 150 may compare touch signal levels stored in the memory 152 associated with the 6:00 location of the watch hands 120, 122. The processor 150 may determine that the watch hands 1102 do not need calibration if the touch signal levels 1116, 1118, 1120, 1122 substantially match the touch signal levels stored in the memory 152. Alternatively, the processor 150 may determine that the watch hands 1102 need calibration if the touch signal levels 1116, 1118, 1120, 1122 do not substantially match the touch signal levels stored in the memory 152 and control the first and second watch hand actuation apparatuses 128, 129 to rotate (move) the watch hands 120, 122 until the touch signal levels 1116, 1118, 1120, 1122 substantially match the touch signal levels stored in the memory 152. It is also contemplated and included within the scope of the invention that the processor 150 may control the position of one or more watch hands 1102 so as to calibrate a touch sensor of the watch 1100 based on the position of one or more watch hands by storing signal levels received from one or more touch sensors first, second, third, and fourth touch sensors, 1106, 1108, 1110, 1112 as touch signal thresholds 1116, 1118, 1120, 1122 corresponding to the one or more known positions of the watch hands 120, 122.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

What is claimed is:

1. A wearable electronic device comprising:
 a housing including a watch face and one or more side walls;
 a protective material positioned above the one or more side walls;
 a touch panel positioned under the protective material and comprising a plurality of touch sensors, each touch sensor associated with a region of the watch face, the touch panel separated from the protective material by an air gap;
 a first watch hand positioned within the air gap and proximate to the touch panel;
 a first watch hand actuation apparatus attached to the first watch hand and configured to rotate the first watch hand within the air gap;
 a memory configured to store a plurality of signal thresholds for each of the plurality of touch sensors, the plurality of signal thresholds associated with a position of the first watch hand; and
 a processor operably coupled to the touch panel, the first watch hand actuation apparatus, and the memory, the processor configured to:
  receive a touch signal from at least one of the plurality of touch sensors,
  determine a position of the first watch hand,
  identify the signal threshold of at least one of the plurality of touch sensors by selecting one of the plurality of signal thresholds based on the determined position of the first watch hand, and
  identify a touch input received by one of the plurality of touch sensors once the touch signal received from the corresponding touch sensor exceeds the selected signal threshold.

2. The wearable electronic device as recited in claim 1, wherein each signal threshold is associated with a touch sensor of the plurality of touch sensors.

3. The wearable electronic device as recited in claim 1 wherein the selected signal threshold corresponds to a proximity of the first watch hand to the at least one of the plurality of touch sensors.

4. The wearable electronic device as recited in claim 1, wherein the first watch hand actuation apparatus is a stepper motor.

5. The wearable electronic device as recited in claim 1, wherein the touch panel comprises a plurality of touch zones, each touch zone associated with at least one of the plurality of touch sensors.

6. The wearable electronic device as recited in claim 5, wherein one of the plurality of signal thresholds is associated with the at least one of the plurality of touch sensors associated with a touch zone.

7. The wearable electronic device as recited in claim 1, further comprising a watch hand position sensor configured to provide a position signal, and wherein the processor is further configured to determine the position of the first watch hand responsive to the received position signal.

8. The wearable electronic device as recited in claim 1, wherein the processor is further configured to select the signal threshold of each of the plurality of touch sensors by selecting one of the plurality of signal thresholds based on the position of the first watch hand.

9. The wearable electronic device as recited in claim 1, further comprising a display positioned below the touch panel and operably coupled to the processor, the processor further configured to control the display to present a user interface.

10. The wearable electronic device as recited in claim 9, wherein the processor is further configured to present the user interface on the display responsive to the determined position of the first watch hand.

11. The wearable electronic device as recited in claim 9, wherein the processor is further configured to control the first watch hand actuation apparatus to position the first watch hand with respect to one or more user interface elements of the user interface.

12. The wearable electronic device as recited in claim 1, wherein the touch panel is associated with a portion of the watch face comprising less than an entirety of the watch face observable through the protective material.

13. The wearable electronic device as recited in claim 1, wherein the touch panel is associated with an entirety of the watch face observable through the protective material.

14. The wearable electronic device as recited in claim 1, wherein the processor is further configured to perform a calibration operation by controlling the first watch hand actuation apparatus to rotate the first watch hand within the air gap until the processor receives a touch signal matching a calibration signal stored in the memory from at least one of the plurality of touch sensors.

15. The wearable electronic device as recited in claim 1, further comprising a second watch hand and a second watch hand actuation apparatus is attached to the second watch hand, the second watch hand actuation apparatus configured to rotate the second watch hand within the air gap, wherein the plurality of signal thresholds stored in the memory are associated with positions of each of the first watch hand and the second watch hand, and wherein the processor is further configured to:
  determine a position of the second watch hand,
  identify the signal threshold of at least one of the plurality of touch sensors by selecting one of the plurality of stored signal thresholds based on the determined position of at least one of the first watch hand and the second watch hand, and
  identify a touch input received by one of the plurality of touch sensors once the touch signal received from the corresponding touch sensor exceeds the selected signal threshold.

16. A wearable electronic device comprising:
  a housing including a watch face and one or more side walls;
  a protective material positioned above the one or more side walls;
  a touch panel positioned under the protective material and comprising a plurality of touch sensors, each touch sensor associated with a region of the watch face, the touch panel separated from the protective material by an air gap;
  a first watch hand positioned within the air gap and proximate to the touch panel;
  a first watch hand actuation apparatus attached to the first watch hand and configured to rotate the first watch hand within the air gap;
  a memory configured to store a plurality of signal thresholds for each of the plurality of touch sensors, the plurality of signal thresholds associated with a position of the first watch hand;
  a display positioned below the touch panel; and
  a processor operably coupled to the touch panel, the watch hand actuation apparatus, the memory, and the display, the processor configured to:
    receive a signal from at least one of the plurality of touch sensors,
    determine a position of the first watch hand,
    identify the signal threshold of at least one of the plurality of touch sensors by selecting one of the plurality of signal thresholds based on the determined position of the first watch hand,
    identify a touch input received by one of the plurality of touch sensors once the signal received from the corresponding touch sensor exceeds the selected signal threshold,
    control the display to present a user interface including one or more user interface elements, and
    control the first watch hand actuation apparatus to position the first watch hand with respect to the one or more user interface elements.

17. A wearable electronic device comprising:
  a housing including a watch face and one or more side walls;
  a protective material positioned above the one or more side walls;
  a touch panel positioned under the protective material and comprising a plurality of touch sensors, each touch sensor associated with a region of the watch face, the touch panel separated from the protective material by an air gap;
  a first watch hand positioned within the air gap and proximate to the touch panel;
  a second watch hand positioned within the air gap and proximate to the touch panel;
  a first watch hand actuation apparatus attached to the first watch hand and configured to rotate the first watch hand within the air gap;
  a second watch hand actuation apparatus attached to the second watch hand and configured to rotate the second watch within the air gap;
  a memory configured to store a plurality of signal thresholds for each of the plurality of touch sensors, the plurality of signal thresholds associated with a position of the first watch hand and the second watch hand;
  a display positioned below the touch panel; and
  a processor operably coupled to the touch panel, the first watch hand actuation apparatus, the second watch hand actuation apparatus, and the memory, the processor configured to:
    receive a touch signal from at least one of the plurality of touch sensors,
    determine a position of each of the first watch hand and the second watch hand,
    identify the signal threshold of at least one of the plurality of touch sensors by selecting one of the plurality of signal thresholds based on the determined position of at least one of the first watch hand and the second watch hand, and
    identify a touch input received by one of the plurality of touch sensors once the touch signal received from the corresponding touch sensor exceeds the selected signal threshold.

18. The wearable electronic device as recited in claim 17, further comprising a watch hand position sensor configured to provide a position signal, and wherein the processor is further configured to determine the position of each of the first watch hand and the second watch hand responsive to the respective received position signals.

19. The wearable electronic device as recited in claim 17, wherein the processor is further configured to control the first watch hand actuation apparatus to position the first watch hand with respect to one or more user interface elements of the user interface.

20. The wearable electronic device as recited in claim 17, wherein the processor is further configured to perform a calibration operation by controlling the first watch hand actuation apparatus to rotate the first watch hand within the air gap until the processor receives a touch signal matching a calibration signal stored in the memory from at least one of the plurality of touch sensors.

* * * * *